United States Patent
Juhlin

(10) Patent No.: US 8,339,818 B2
(45) Date of Patent: Dec. 25, 2012

(54) METHOD AND DEVICE TO COMPENSATE FOR AN ASYMMETRICAL DC BIAS CURRENT IN A POWER TRANSFORMER CONNECTED TO A HIGH VOLTAGE CONVERTER

(75) Inventor: Lars-Erik Juhlin, Ludvika (SE)

(73) Assignee: ABB Technology AG, Zürich (CH)

( * ) Notice: Subject to any disclaimer, the term of this patent is extended or adjusted under 35 U.S.C. 154(b) by 248 days.

(21) Appl. No.: 12/675,814

(22) PCT Filed: Aug. 31, 2007

(86) PCT No.: PCT/EP2007/059132
§ 371 (c)(1),
(2), (4) Date: Oct. 25, 2010

(87) PCT Pub. No.: WO2009/026968
PCT Pub. Date: Mar. 5, 2009

(65) Prior Publication Data
US 2011/0032739 A1   Feb. 10, 2011

(51) Int. Cl.
*H02M 7/00* (2006.01)
(52) U.S. Cl. ............ 363/56.02; 363/53; 363/89; 363/98
(58) Field of Classification Search ............ 363/39, 363/40, 44, 50, 52, 53, 56.02, 89, 95, 98, 363/127, 132; 323/205, 207, 355, 356; 307/1, 307/2, 3, 4
See application file for complete search history.

(56) References Cited

U.S. PATENT DOCUMENTS 5,012,400 A * 4/1991 Yasuda ............ 363/95
5,177,428 A * 1/1993 Hirose et al. ............ 323/207
(Continued)

FOREIGN PATENT DOCUMENTS
DE   3109742 A1   9/1982
(Continued)

OTHER PUBLICATIONS

PCT/ISA/210—International Search Report—Jun. 4, 2008.
PCT/ISA/237—Written Opinion of the International Searching Authority—Jun. 4, 2008.
PCT/IPEA/409—International Preliminary Report on Patentability—Sep. 15, 2009.

*Primary Examiner* — Gary L Laxton
(74) *Attorney, Agent, or Firm* — Venable LLP; Eric J. Franklin

(57) ABSTRACT

A method and a device to compensate for an asymmetrical DC bias current in a multi-phase transformer. The transformer is connected between an AC power system and an AC/DC or DC/AC high voltage converter. For each phase of the AC side of the transformer a current quantity is determined. The current quantity reflects the time dependent behavior of the magnetizing current in the phase. Time intervals in the current quantity are determined during which the current quantity reaches a positive or a negative maximum, respectively. A DC magnetizing quantity is determined from a difference between the amplitude of the positive maximum and the amplitude of the negative maximum. An asymmetrical quantity is determined from a difference between the amplitudes of the positive and/or negative maxima of at least two of the phases and a control signal is generated from the asymmetrical quantity and provided to a control device of the converter in order to adjust the generation of the AC or DC voltage in the particular phase of the converter which corresponds to the phase of the AC side of the transformer.

17 Claims, 22 Drawing Sheets

U.S. PATENT DOCUMENTS

| | | | |
|---|---|---|---|
| 5,450,310 A | * | 9/1995 | Kawakami ................... 363/96 |
| 5,867,376 A | * | 2/1999 | Nakamura et al. ......... 363/56.01 |
| 2006/0256586 A1 | | 11/2006 | Ohshima et al. |

FOREIGN PATENT DOCUMENTS

| | | |
|---|---|---|
| JP | 57097368 A | 6/1982 |

* cited by examiner

US 8,339,818 B2

METHOD AND DEVICE TO COMPENSATE FOR AN ASYMMETRICAL DC BIAS CURRENT IN A POWER TRANSFORMER CONNECTED TO A HIGH VOLTAGE CONVERTER

CROSS-REFERENCE TO RELATED APPLICATIONS

This application is the national phase under 35 U.S.C. §371 of PCT/EP2007/059132 filed 31 Aug. 2007.

FIELD OF THE INVENTION

The invention relates to a method and a device to compensate for an asymmetrical DC bias current in a multi-phase transformer, where the transformer is connected between an AC system and a AC/DC or DC/AC high voltage converter and where at least one side of the transformer is star connected and the star point is grounded via a neutral.

BACKGROUND OF THE INVENTION

A transformer coupled between an AC power system and a AC/DC or DC/AC converter is usually subject to DC bias currents which means that a certain DC magnetization in the transformer occurs. The DC bias currents may be caused by a DC component in the AC voltages on the AC side of the converter which is unavoidable due to small asymmetries in the switching control of the converter valves as well as due to small differences in the reaction, i.e. in the switching characteristics of the valves. In case of a grounded star-connected transformer, a DC bias current may also be introduced into the transformer via the transformer neutral, which occurs for example in HVDC systems (High Voltage Direct Current) with ground return. This is called external DC magnetization in the following. The DC magnetization may result in an unwanted saturation of the transformer which can create significant vibration and audible noise or even lead to overcurrents and a burn-out of the transformer.

In an article "Study on Effects of DC Current on Transformers during HVDC Systems Operated in Ground-return Mode", Proceedings of the XIVth International Symposium on High Voltage Engineering, Bejing, China, Aug. 25-29, 2005, different methods are mentioned of how to mitigate or block a DC current flowing from an HVDC system via earth through a transformer neutral. Such methods are for example to add a resistor or a capacitor in series with the neutral or to inject a reverse compensating DC current via the neutral. In general, a DC current injected via the neutral results in a symmetrical DC magnetization in the transformer, i.e. the same magnetizing current flows in all the phases of the transformer.

In EP 0475 709 B1, an inverter control device is described which is capable of suppressing DC magnetization in a three-phase transformer in order to prevent a transformer burn-out. The transformer is connected to the AC side of an inverter and is not grounded. The inverter control device determines two correcting signals from at least two of the three phase currents on the AC side of the inverter, where the correcting signals are used to correct two reference signals which are input to a control unit to control the AC output voltages of the inverter. The inverter control device thereby regulates the imbalances or asymmetries in the three output AC voltages in such a way that the DC current component of each phase becomes zero.

In modern HVDC systems, voltage source converters are used instead of line commutated converters. In the valves of the voltage source converters, the converter valves are made up of IGBTs in anti-parallel connection with so called free-wheeling diodes while in line commutated converters thyristor valves are used. The free-wheeling diodes commutate freely and with much higher frequency than the line commutated thyristors. Since the commutation of the free-wheeling diodes is not directly controlled, it is more difficult to generate purely symmetrical output voltages with a voltage source converter than with a line commutated converter, which results in asymmetries in the AC voltages on the AC side of an AC/DC or DC/AC converter. This increases the problem with DC bias currents in the transformer connected to the converter which results in higher vibration and increased audible noise. Additionally, harmonics may occur which cause interferences in nearby telephone communication lines.

SUMMARY OF THE INVENTION

It is an object of the present invention to decrease the audible noise and reduce telephone interferences by providing a method and a device to compensate for an asymmetrical DC bias current in a multi-phase transformer, where the transformer is connected between an AC power system and a AC/DC or DC/AC high voltage converter and where at least one side of the transformer is star connected and the star point is grounded via a neutral.

The object is achieved by a method and a device which is arranged to carry out the method.

The invention is based on the recognition of the fact that in case of a star-ground-star connected transformer (Y0/Y), a DC magnetization can be observed as a distinct pattern in the current flowing in the neutral on the transformer side connected to the AC power system, where the pattern shows clear maxima and minima when the magnetic flux in one of the transformer phases reaches a maximum or minimum, respectively. These maxima and minima occur always at the same electrical angle for each of the transformer phases. Asymmetries in the magnetization are seen as differences in the current amplitudes corresponding to the different phases. Further investigations showed that for other transformer configurations with a grounded star connection on the transformer side to the AC power system, different but still distinctive patterns can be seen in the time dependent behaviour of a magnetizing current which is calculated based on measurements of phase currents from one or both transformer sides and, in case a star connected transformer side is grounded, based on the current flowing in the neutral. Accordingly, it is the basic idea of the invention to detect the maxima and minima in the neutral current directly or in the calculated magnetizing current, to assign them to the corresponding transformer phase and to compare if the amplitudes of the maxima and minima for the phases differ or not. From the differences in the amplitudes control signals are then generated phase-wise to adjust the switching of the converter valves in the corresponding converter phase in order to reduce the asymmetries between the phases.

Therefore, according to the invention, for each phase of the AC side of the transformer, i.e. for each phase of the side of the transformer coupled to the AC power system, a current quantity is determined, where the current quantity reflects the time dependent behaviour of the magnetizing current in the phase. In the current quantity, at least a first time interval is determined during which the current quantity reaches a positive maximum and at least a second time interval is determined during which the current quantity reaches a negative maximum. A DC magnetizing quantity is determined from a difference between the amplitude of the positive maximum and the amplitude of the negative maximum and afterwards an asymmetrical quantity is determined from a difference between the amplitudes of the positive and/or negative maxima of at least two of the phases. Finally, a control signal is generated from the asymmetrical quantity and the control signal is provided to a control device of the converter in order to adjust the generation of the AC or DC voltage in the particular phase of the converter which corresponds to the phase of the AC side of the transformer. The phase-wise adjustment of the AC or DC voltage in the converter leads to a reduction or—in the best case—to an elimination of the asymmetries in the magnetizing current flowing in the transformer, which reduces the transformer saturation and thereby the resulting vibration. A reduced vibration decreases on one hand the mechanical stress on the transformer and on the other hand the resulting noise and telephone interferences.

According to a preferred embodiment, the DC magnetizing quantity for each phase is determined by superimposing the positive and the negative maximum of that phase.

According to a further preferred embodiment, the asymmetrical quantity for each phase is determined by superimposing the DC magnetizing quantity of that phase with the DC magnetizing quantities of the other phases. For a transformer with a number of m phases this superimposition is performed by multiplying the DC magnetizing quantity with m reduced by one and by afterwards subtracting the DC magnetizing quantities of the other phases. This ensures that in case of a symmetrical magnetization in all phases, the result of the superimposition will be zero, i.e. all symmetrical DC components will be fully eliminated in the respective DC magnetizing quantity.

In case that the converter is an AC/DC converter, the generation of the DC voltage in the particular phase of the converter is adjusted so that the DC voltage is decreased when the corresponding asymmetrical quantity is positive and increased when the corresponding asymmetrical quantity is negative.

Sine the compensation of asymmetrical DC magnetization is only usefully applied during normal operating conditions and in order not to disturb any protection and control functions in case of a fault in the AC power system, in the transformer or in the converter, it is suggested according to a further embodiment that the control signal is reduced to zero in case of a fault or disturbance.

BRIEF DESCRIPTION OF THE DRAWINGS

The invention is now described by way of example with reference to the accompanying drawings in which.

DETAILED DESCRIPTION OF EMBODIMENTS OF THE INVENTION

Figure 1:
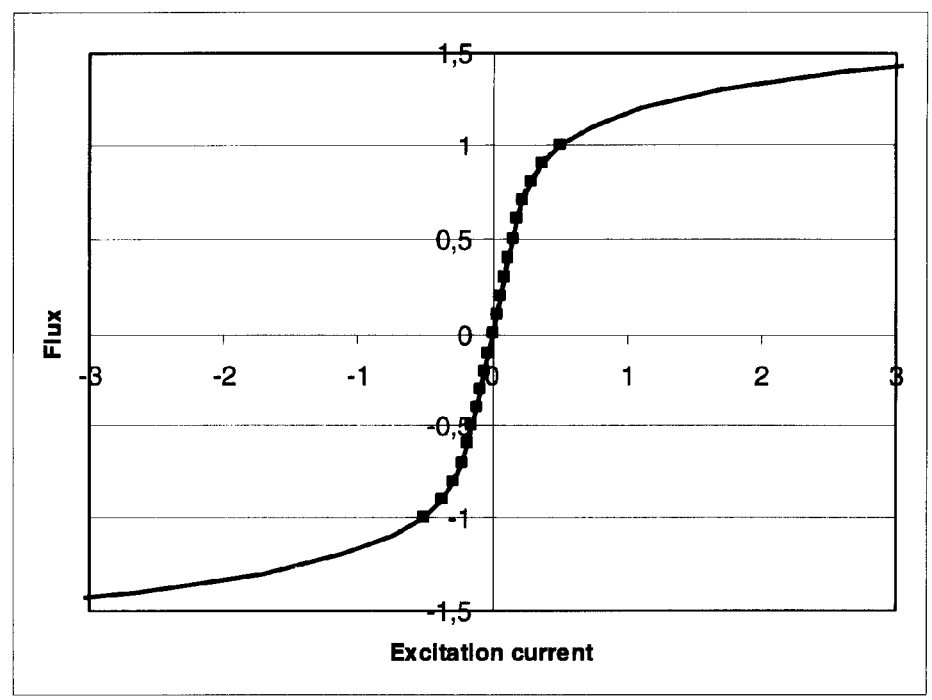
FIG. 1 shows a typical magnetization curve for a transformer with an operating range at no DC magnetization.
Figure 2:
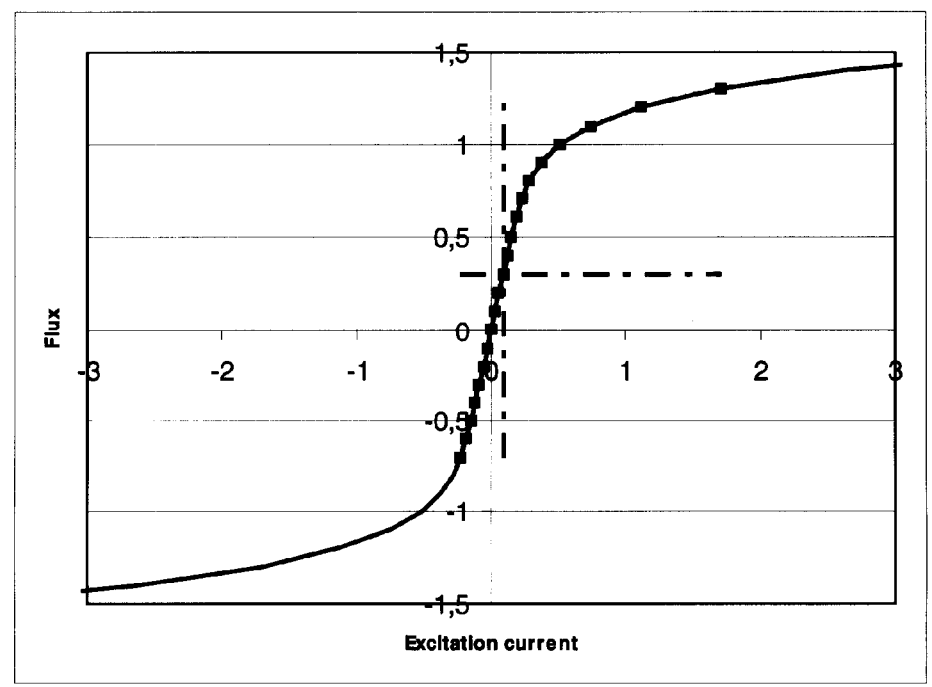
FIG. 2 shows the shift of the operating range when DC magnetization occurs.

FIG. 1 shows a typical magnetization curve for a transformer. A usual operating range for the case of no DC magnetization is marked with square points. In comparison, FIG. 2 shows how the magnetization curve and with it the operating range of FIG. 1 is shifted when a DC magnetization occurs. It can be clearly seen that the operating range becomes asymmetrical so that the maximum amplitude of the excitation or magnetizing current with positive polarity is much higher than the maximum amplitude of the magnetizing current with negative polarity.

Figure 3:
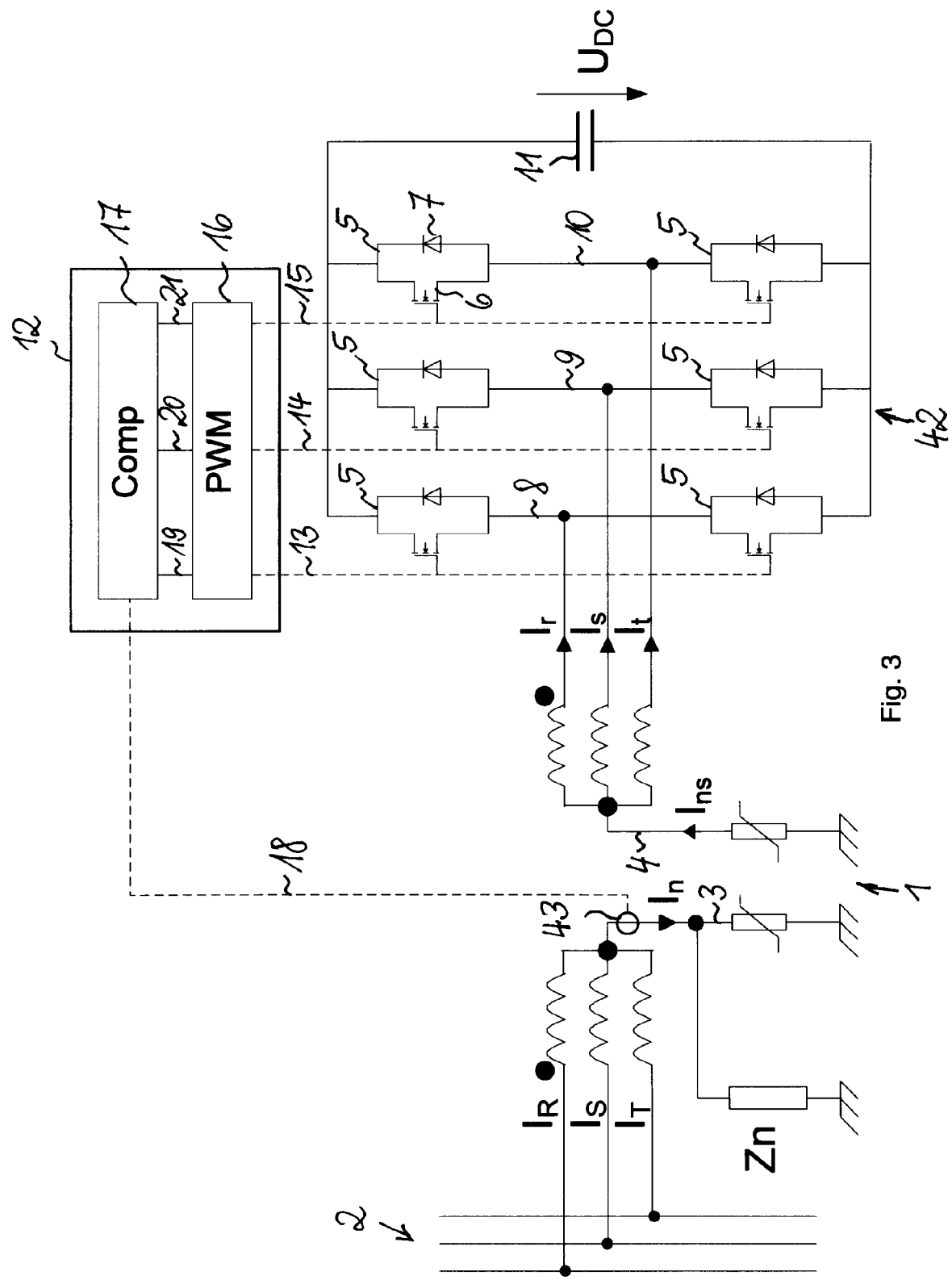
FIG. 3 shows a Y0/Y connected transformer between an AC-power system and an AC/DC or DC/AC converter plus a control device for the converter.

In FIG. 3, a three-phase two-winding transformer 1 is shown, which is connected on its primary side with the phases R, S and T to an AC power system 2 and on its secondary side with the phases r, s, and t to an AC/DC high voltage converter 42. The transformer 1 is star-ground-star connected (Y0/Y), i.e. both windings are star connected and the star points are connected to ground, via a first neutral 3 on the primary side and via a second neutral 4 on the secondary side. The AC/DC converter 42 is a voltage source converter which comprises a so called 6-pulse bridge with six converter valves 5, where each valve comprises at least one IGBT 6 in anti-parallel connection with at least one free-wheeling diode 7. The 6-pulse bridge is arranged in the commonly known way with three phases 8, 9 and 10 and two valves 5 per phase and with the AC side of the converter 42 connected to the secondary side of the transformer 1 and with a capacitor 11 on the DC side of the converter 42. On the AC side, the first phase 8 of the converter 42 is connected to the first secondary phase r of the transformer, the second phase 9 of the converter 42 is connected to the second secondary phase s of the transformer and the third phase 10 of the converter 42 is connected to the third secondary phase t of the transformer. A control device 12 generates six signals, one for each converter valve 5, to switch the IGBTs 6 in the valves on or off in order to generate a desired DC voltage $U_{DC}$. The control device 12 transmits the signals via the control lines 13 to 15 to the gates of the IGBTs 6. The switching signals are generated by a pulse width modulation unit 16 (PWM). Additionally, a device 17 to compensate for asymmetrical DC bias current in the transformer 1 is integrated in the control device 12. The device 17 receives as input via the signal line 18 measurements of the current $I_n$ flowing in the primary neutral 3, measured by a current sensor 43. If the current in the primary neutral 3 is not measurable, it can instead be calculated by adding the three phase currents $I_R$, $I_S$ and $I_T$. The output of the device 17 are a first control signal 19 to adjust the DC voltage generation in the first converter phase 8, a second control signal 20 for the second converter phase 9 and a third control signal 21 for the third converter phase 10.

Figure 4:
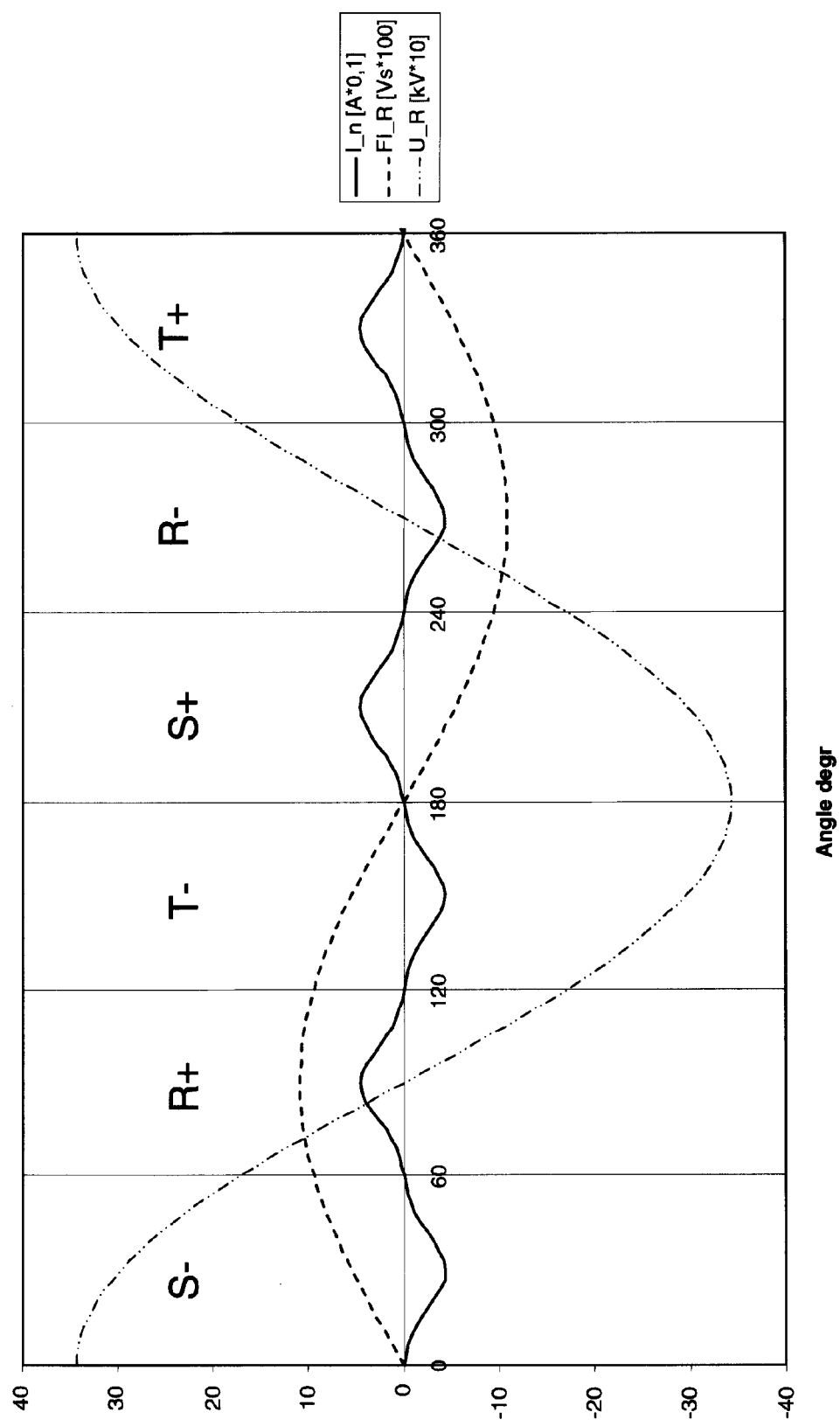
FIG. 4 shows electric and magnetic quantities of the transformer for non DC magnetization.

The diagram of FIG. 4 shows the current $I_n$ flowing in the primary neutral 3 as well as the magnetic flux $FI_R$ and the phase voltage $U_R$ in the first primary transformer phase R for the case that no DC magnetization occurs in the transformer 1. The quantities are depicted over the electrical phase angle in a range between 0° and 360°. As can be seen, a maximum and a minimum occurs in the neutral current $I_n$ for each of the three phases R, S and T during the corresponding electrical phase angle ranges R+, R−, S+, S−, T+ and T−. Looking only at the first phase R, it becomes clear that each zero-crossing of the phase voltage $U_R$ results in a maximum or minimum in the magnetic flux $FI_R$ and that the maxima and minima in the neutral current $I_n$ occur at the same electrical phase angle as the voltage zero-crossings.

Figure 5:
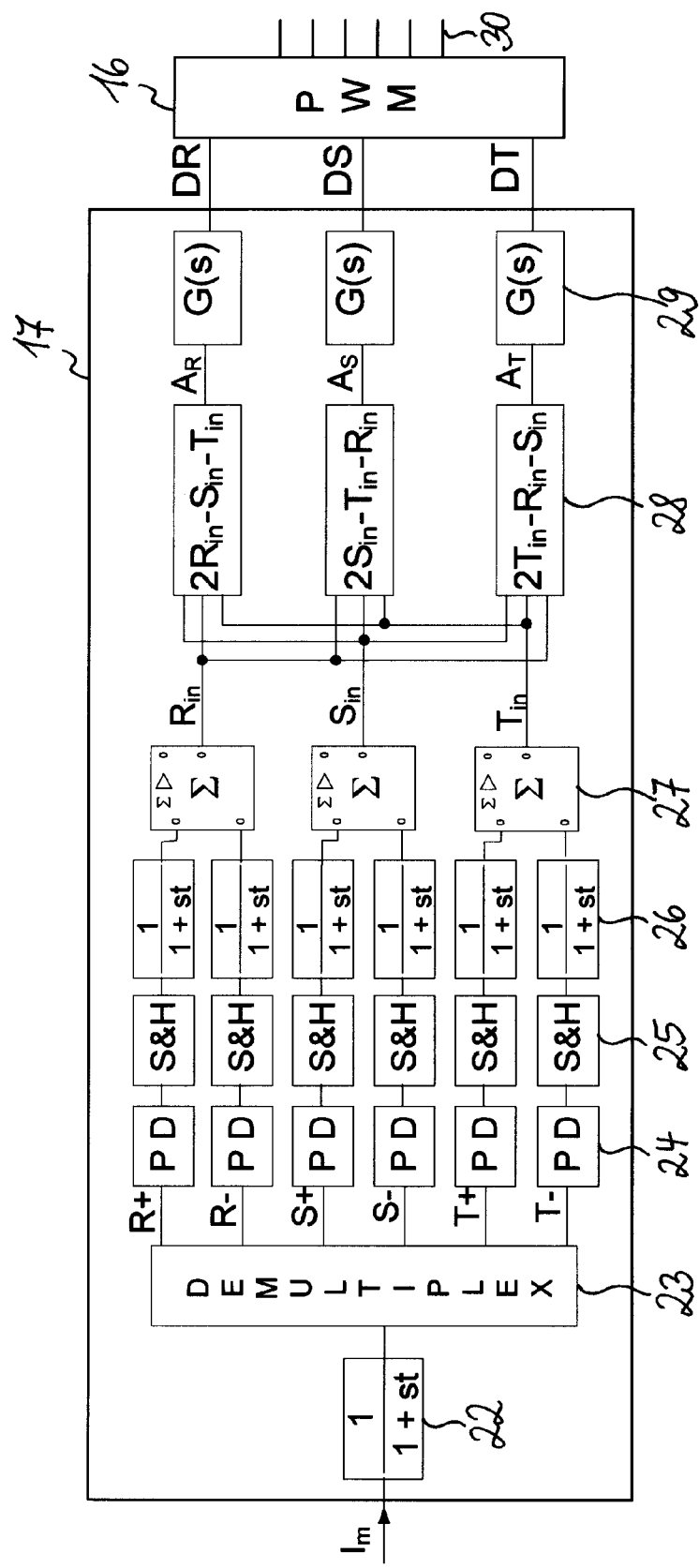
FIG. 5 shows the elements of a device to compensate for asymmetrical DC bias currents.

FIG. 5 shows a device 17 to compensate for asymmetrical DC bias current in a transformer connected to an AC/DC or DC/AC converter. The device 17 comprises a first low-pass filter 22, a demultiplexer 23, six peak detectors 24, six sample-and-hold units 25, six second low-pass filter 26, three first superimposition units 27, three second superimposition units 28 and three controller units 29. The device 17 receives as input signal a current quantity $I_m$, which in case of the Y0/Y connected transformer of FIG. 3 equals to the current $I_n$ flowing in the primary neutral 3. The current quantity $I_m$ is low-pass filtered in the first filter 22 and the filter output is entered into demultiplexer 23. There, the current quantity $I_m$, is demultiplexed into six components according to the six phase angle ranges which correspond to the maxima and minima of the three phases R, S and T. The six current components R+, R−, S+, S−, T+ and T− belong to the following ranges of the electrical phase angle:

|  |  |
|---|---|
| R+: | 60° to 120°, |
| R−: | 240° to 360°, |
| S+: | 180° to 240°, |
| S−: | 0° to 60°, |
| T+: | 300° to 360°, |
| T−: | 120° to 180°. |

For each of the six current components, the maximum positive or negative amplitude is determined by one of the peak detectors 24 and saved by one of the sample-and-hold units 25. The result is low-pass filtered in one of the second filters 26. Afterwards, the signals with the maximum positive and negative amplitudes corresponding to one and the same of the three phases R, S and T are superimposed in one of the first superimposition units 27, thereby creating for each phase a DC magnetizing quantity Rin, Sin and Tin, respectively. The three DC magnetizing quantities are then superimposed for each of the three phases in one of the second superimposition units 28, where the DC magnetizing quantity of the relating phase is multiplied by two and where the DC magnetizing quantities of the other phases are subtracted afterwards. The second superimposition units 28 eliminate all symmetrical components in the DC magnetizing quantities Rin, Sin and Tin and deliver for each of the phases a signal $A_R$, $A_S$ or $A_T$, respectively, which represents solely the asymmetrical DC magnetization. This signal is also called asymmetrical quantity and is input to one of the controller units 29, where a control signal DR, DS or DT, respectively, is generated to influence in the PWM unit 16 the generation of the six switching signals 30 for the six converter valves. The control signal DR for the first transformer phase DR thereby adjusts the DC voltage generation in the first converter phase 8, and the other two control signals DS and DT function accordingly. In case of the AC/DC converter of FIG. 3, the control signal is generated in such a way that the DC voltage in the respective converter phase is decreased when the asymmetrical quantity $A_R$, $A_S$ or $A_T$, respectively, is positive and increased when the asymmetrical quantity $A_R$, $A_S$ or $A_T$, respectively, is negative In FIG. 6, intermediate signals of device 17 can be seen for the generation of the DC magnetizing quantity Rin of the first transformer phase R in case of non DC magnetization. It is assumed in this and in all other cases described below that all currents are zero before the electrical phase angle of 0°. Apart from that, the first and second filters 22 and 26 are neglected and the controller units 29 do not show any dynamic or time dependent behaviour. For clarity reasons, the outputs S&HR+ and S&HR− of the sample-and-hold units 25 corresponding to the first phase R as well as the DC magnetizing quantity Rin are depicted with an offset of −20. Since the maximum positive and negative amplitudes in the current components R+ and R− for the first phase R have the same absolute value, the DC magnetizing quantity Rin becomes zero eventually.

Figure 7:
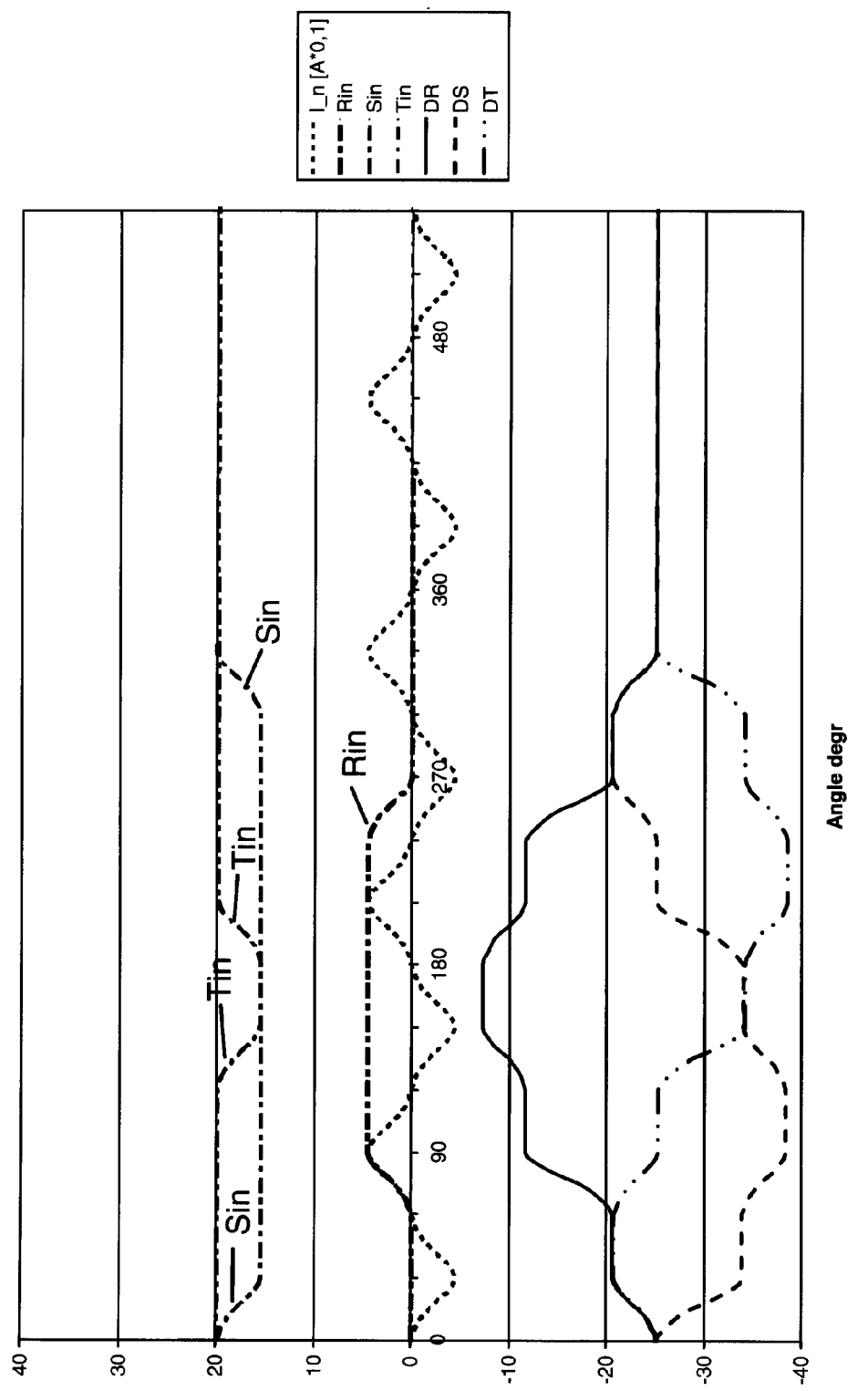
FIG. 7 shows further intermediate and the control signals of the device for non DC magnetization.

The same applies to the DC magnetizing quantities of the second and the third transformer phases, Sin and Tin. This can be seen in FIG. 7, where the two signals are depicted with an offset of +20. The control signals for the three phases, DR, DS and DT, are shown in FIG. 7 with a negative offset of −25. As could be expected from the absence of any DC magnetization, the control signals settle at zero.

Figure 6:
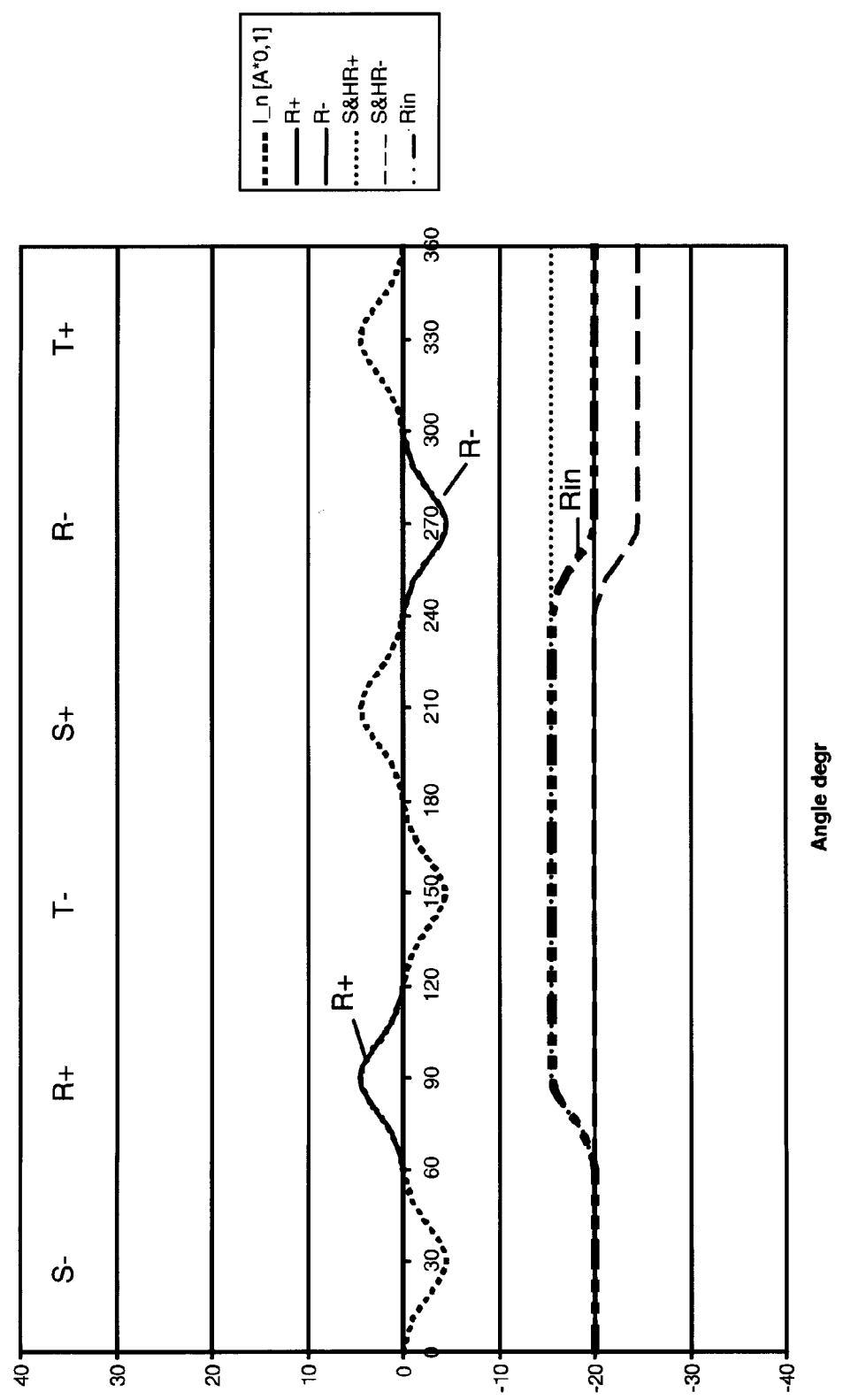
FIG. 6 shows the input and intermediate signals of the device for non DC magnetization.
Figure 8:
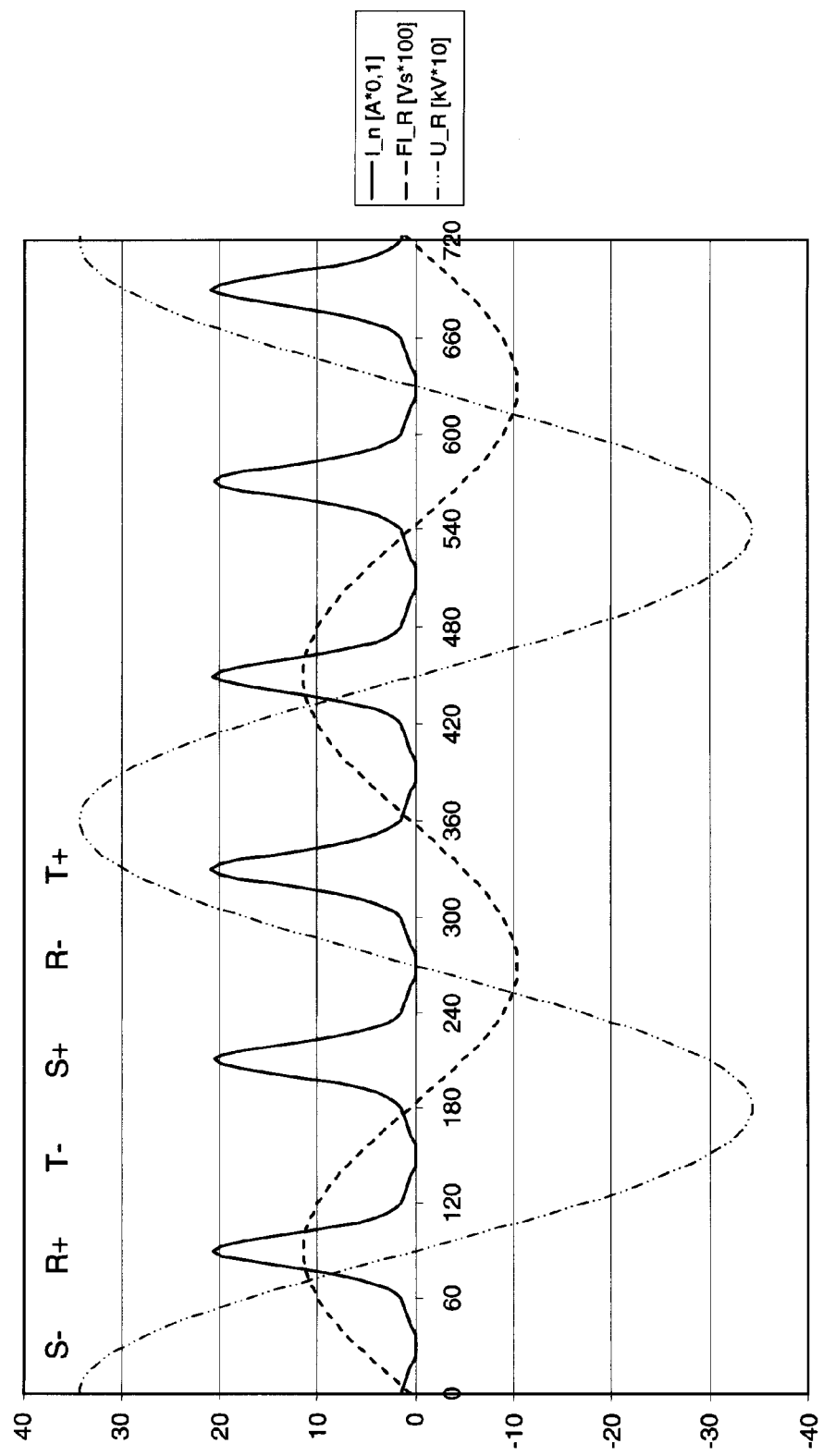
FIG. 8 shows electric and magnetic quantities of the transformer for external DC magnetization.
Figure 9:
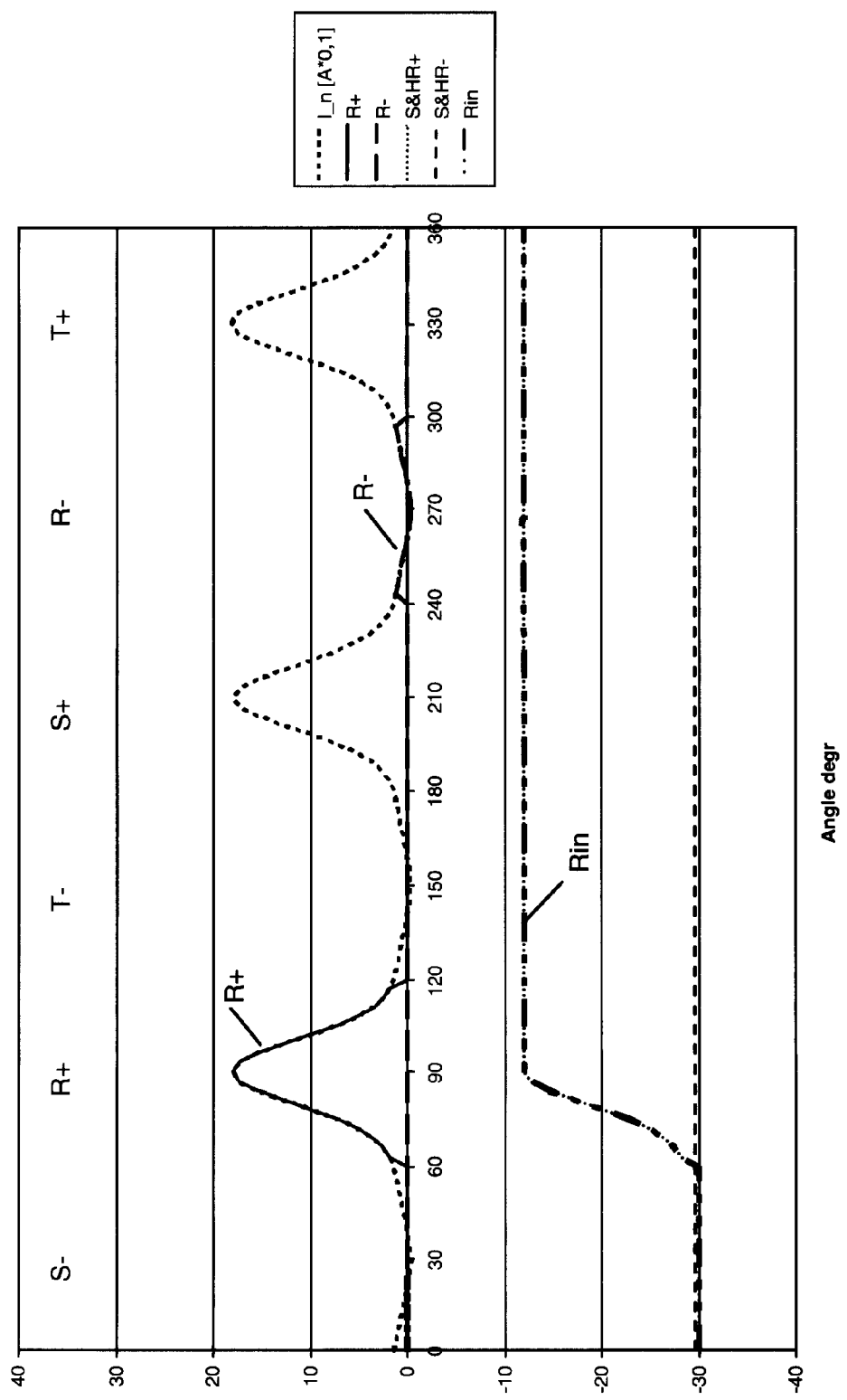
FIG. 9 shows the input and intermediate signals of the device for external DC magnetization.
Figure 10:
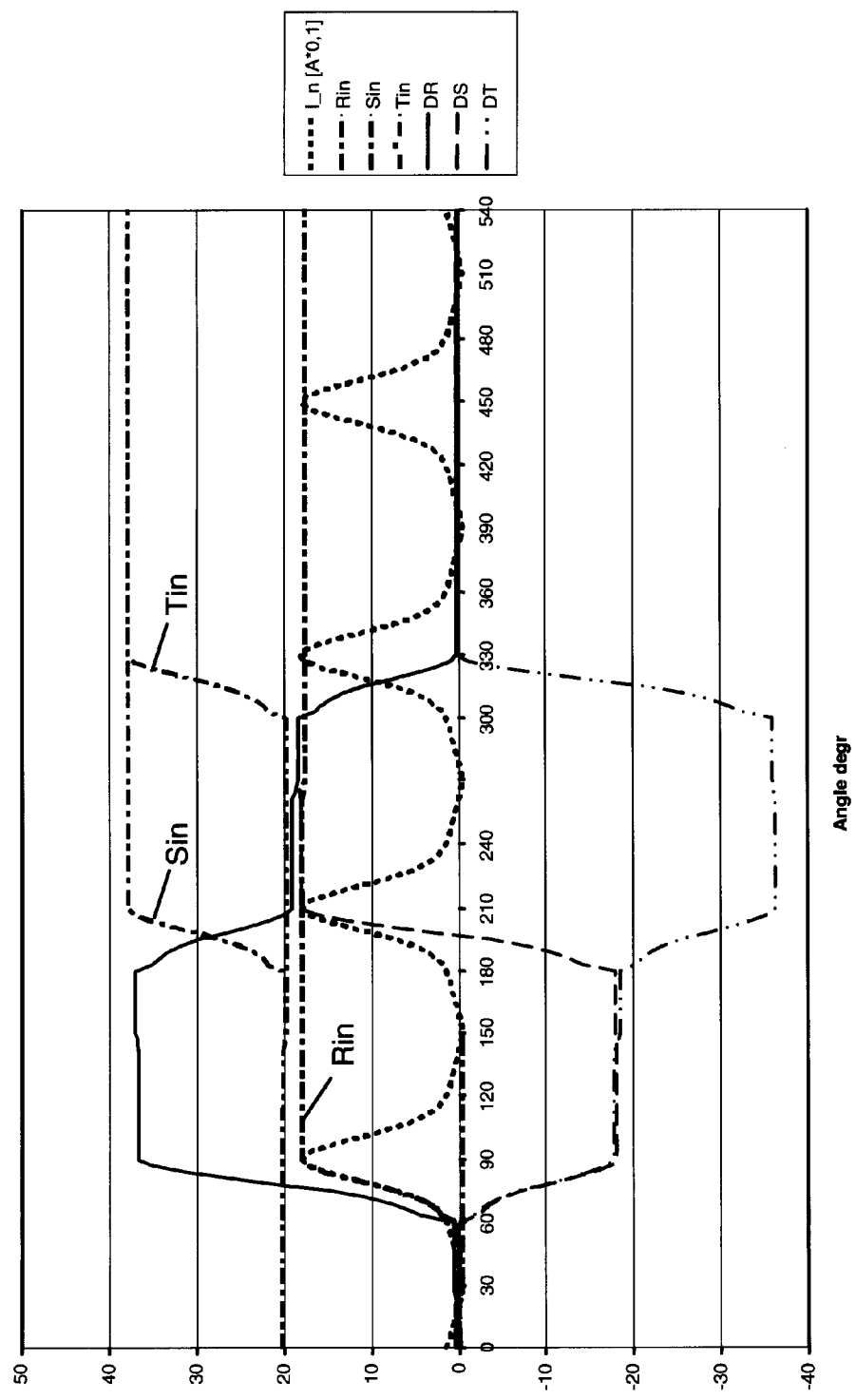
FIG. 10 shows further intermediate and the control signals of the device for external DC magnetization.
Figure 11:
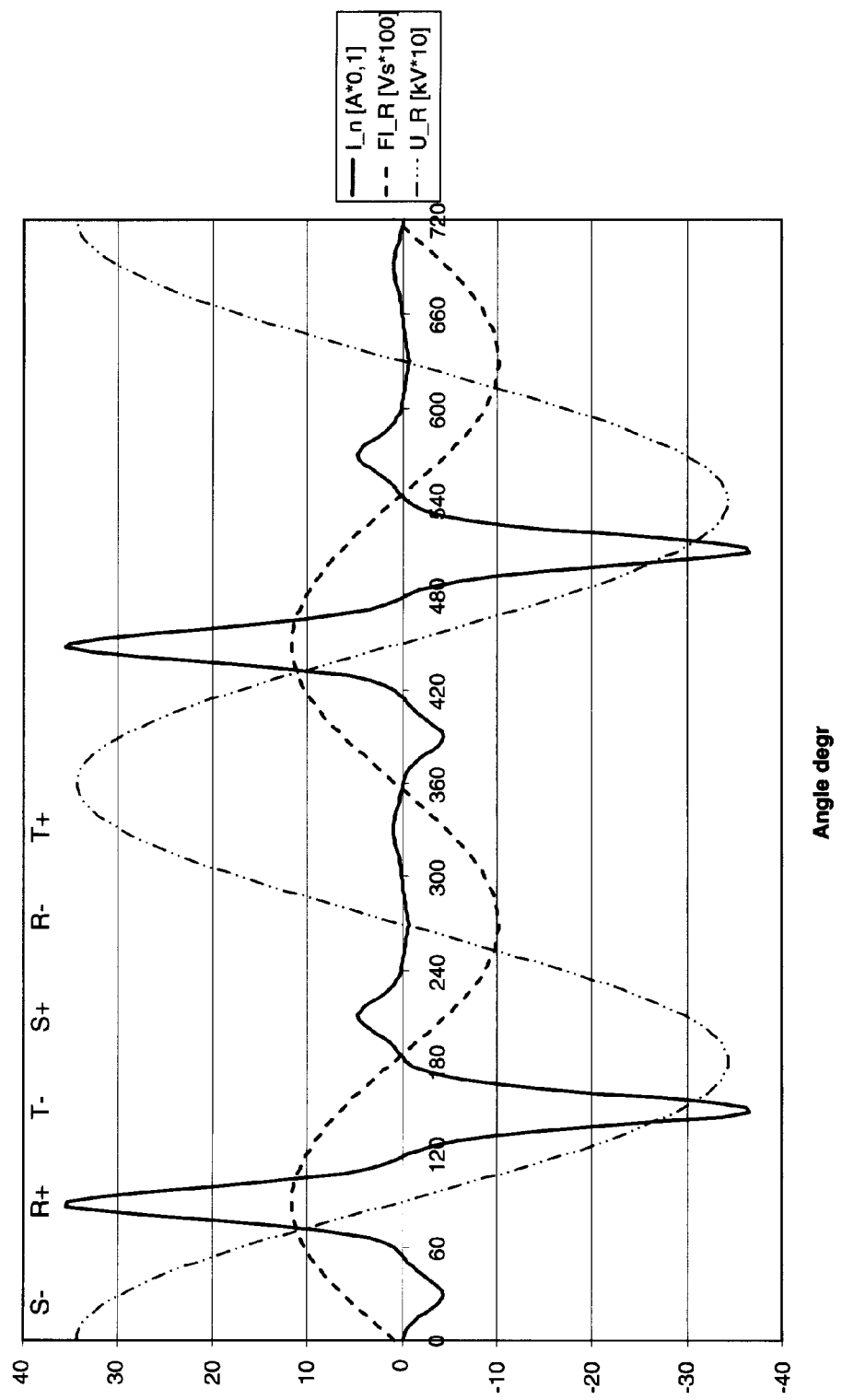
FIG. 11 shows electric and magnetic quantities of the transformer for DC magnetization between phases R and T.
Figure 12:
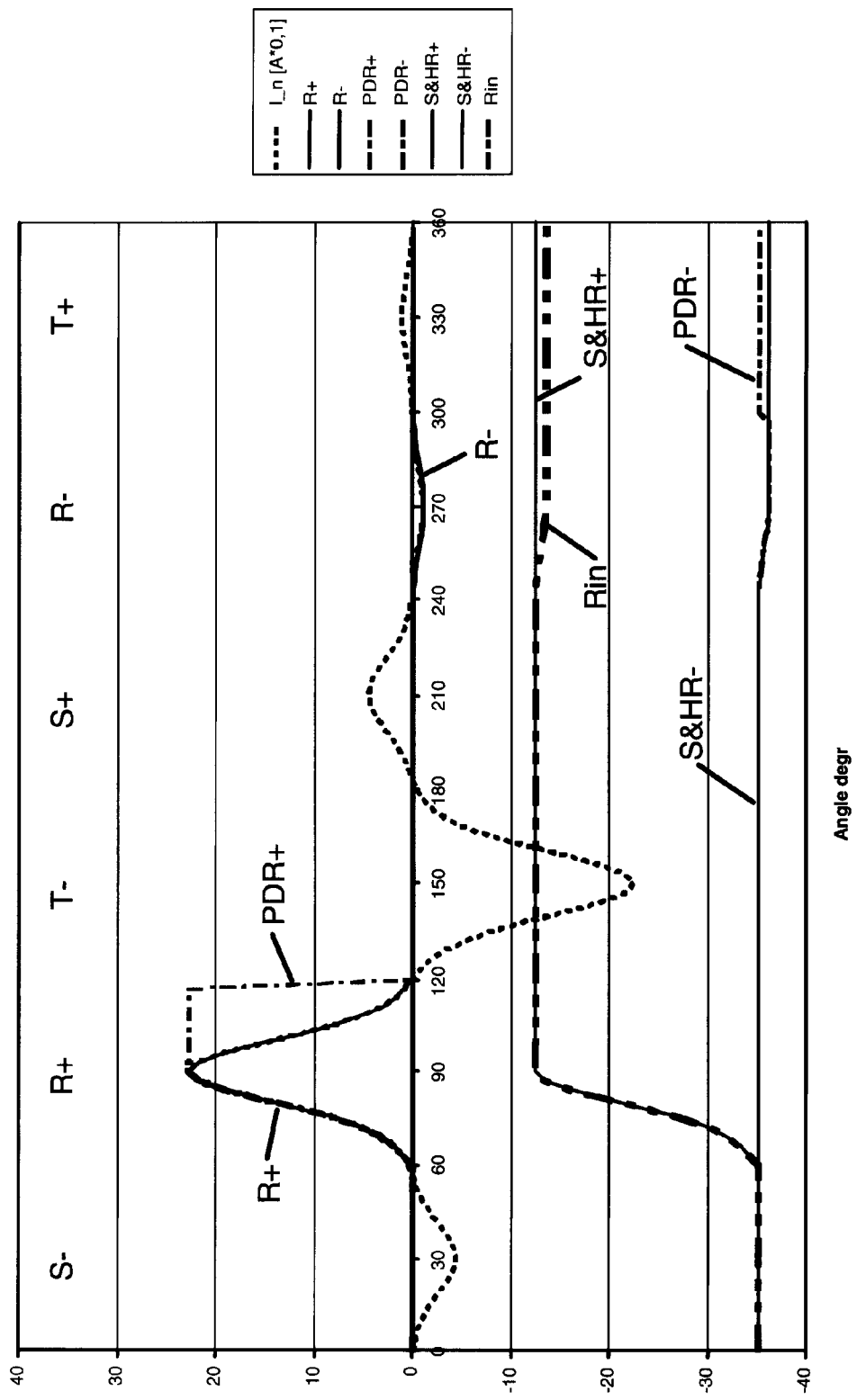
FIG. 12 shows the input and intermediate signals of the device for DC magnetization between phases R and T.

FIGS. 8 to 10 show the same signals as FIGS. 4, 6 and 7, but for an external DC magnetization when a DC bias current is injected via earth through the transformer neutrals. In FIG. 9, the DC magnetizing quantity Rin and the outputs S&HR+ and S&HR− of the sample-and-hold units 25 are depicted with an offset of −30. FIG. 10 shows the DC magnetizing quantities Sin and Tin with an offset of +20. FIG. 8 visualizes again the relationship between zero-crossings in the phase voltage $U_R$ and corresponding peaks in the neutral current $I_n$. For each of the three transformer phases R, S and T, the same amplitude occurs in the neutral current $I_n$, which means that the DC magnetization is symmetrical between the phases. Accordingly, the control signals DR, DS and DT settle again at zero (FIG. 10). The DC magnetizing quantities of the three phases Rin, Sin and Tin remain at a constant level different from zero, but they all have the same value.

Figure 13:
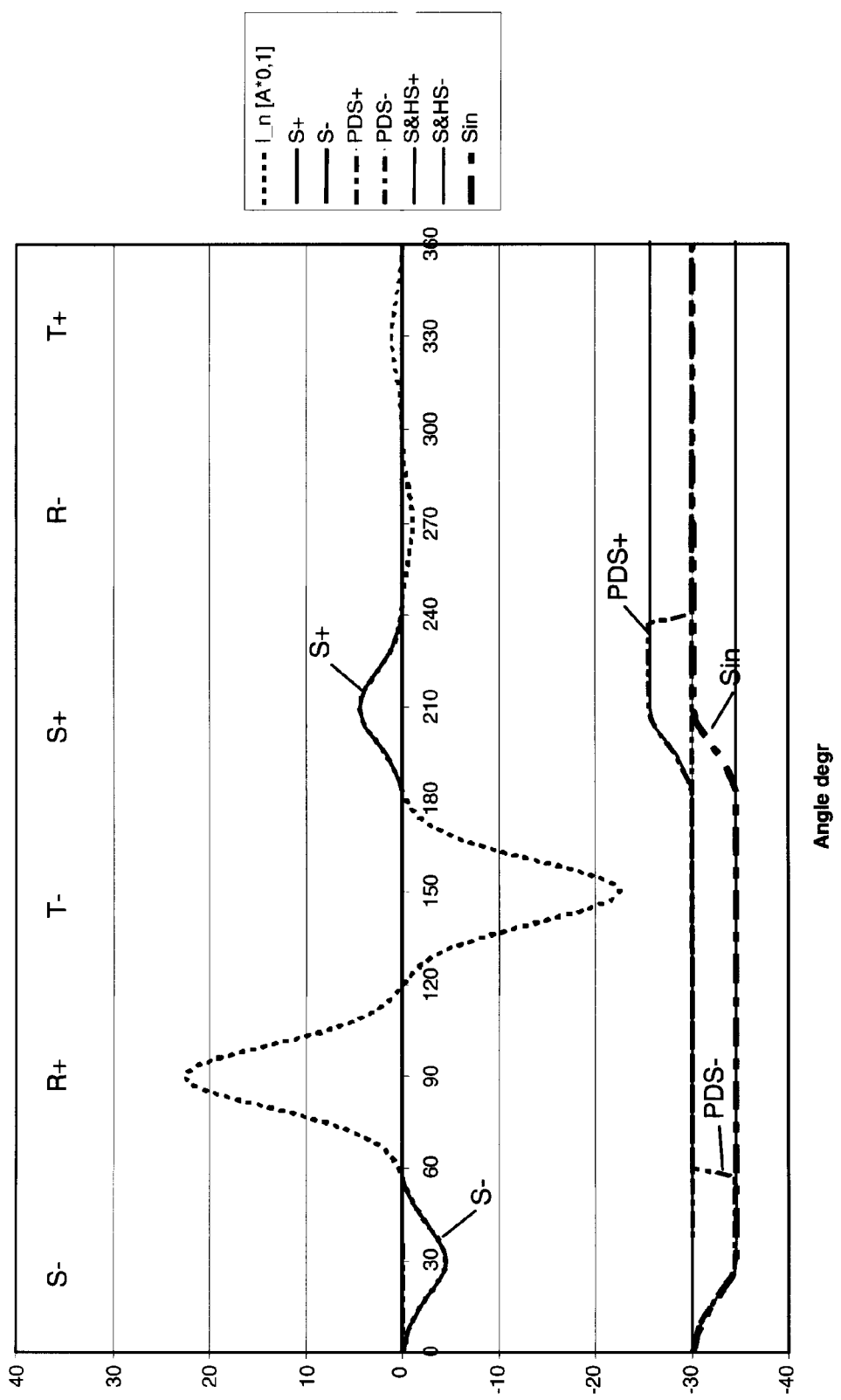
FIG. 13 shows the input and further intermediate signals of the device for DC magnetization between phases R and T.
Figure 14:
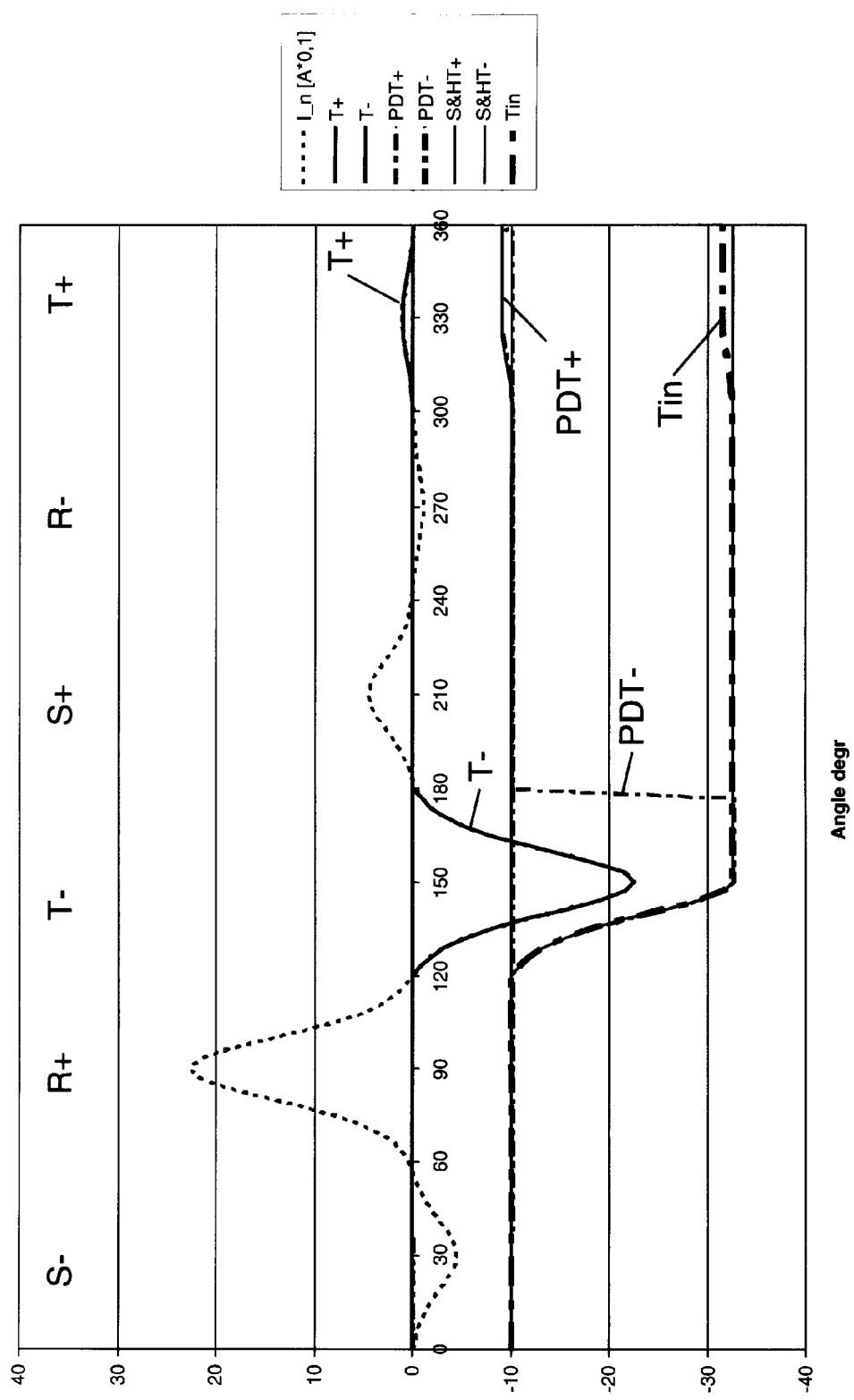
FIG. 14 shows the input and even further intermediate signals of the device for DC magnetization between phases R and T.
Figure 15:
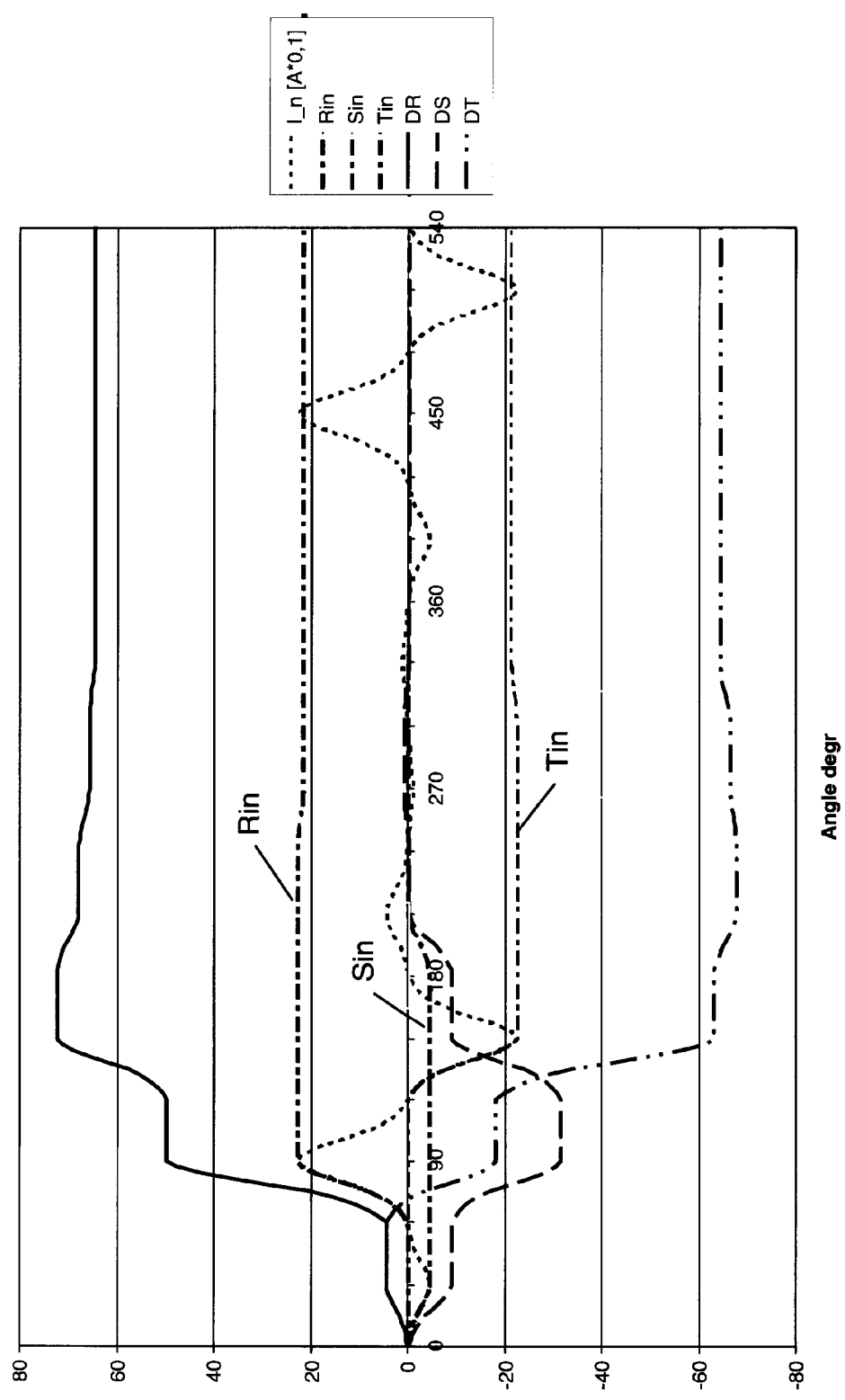
FIG. 15 shows the input and the control signals of the device for DC magnetization between phases R and T.
Figure 16:
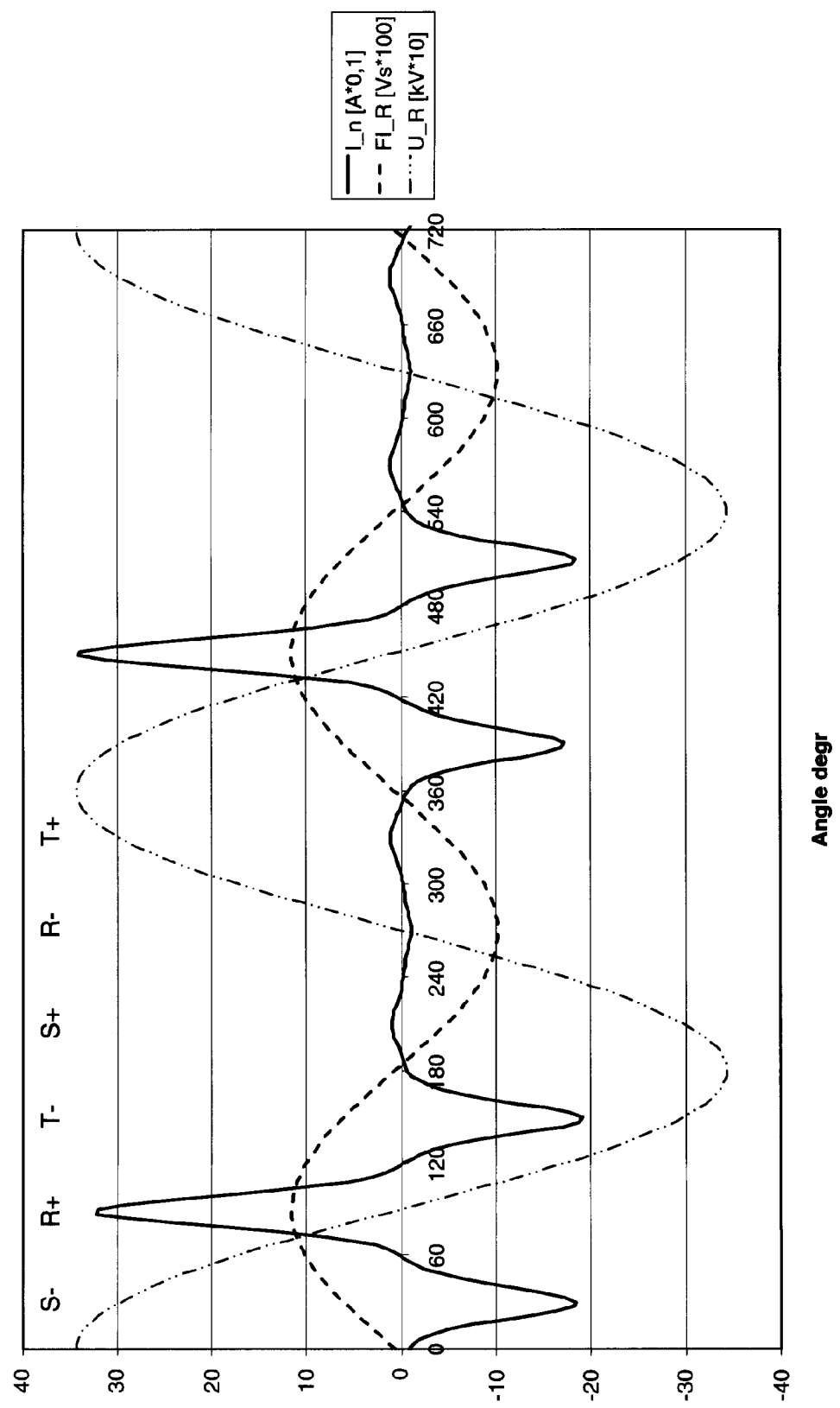
FIG. 16 shows electric and magnetic quantities of the transformer for DC magnetization between phases R, T and S.

In FIGS. 11 to 15, the input, intermediate and output signals of device 17 are shown for the case of a DC magnetization between the phases R and T. The neutral current $I_n$ now shows different amplitudes in the different electrical phase angle ranges (FIG. 11), i.e. the DC magnetization is asymmetrical between the phases. For the first phase R a considerable positive current component R+ can be seen (FIG. 12), while the negative current component R− is almost negligible. The magnetic quantity Rin, which as well as the quantities S&HR+, S&HR− and PDR− is depicted with an offset of −35, shows an almost constant characteristics at the maximum positive current amplitude. For the third phase T, the situation is just the opposite, i.e. the positive current component T+ is almost negligible and the negative current component T− dominates the magnetic quantity Tin (FIG. 14). In FIG. 14, the quantities PDT+, PDT−, S&HT+, S&HT− and Tin are shown with an offset of −10. In the second phase S, the DC magnetization is equal in positive and negative direction, which can be seen in the equal amplitudes of the positive and the negative current components S+ and S− (FIG. 13). Accordingly, the magnetic quantity Sin settles at zero value. The quantities PDS+, PDS−, S&HS+, S&HS− and Sin have an offset of −30 in FIG. 13. The resulting control signals for the three phases are shown in FIG. 15. The control signal DR for the first phase R settles at a positive value, which results in a reduction of the DC voltage in phase 8 of the converter. The control signal DS for the second phase S settles at zero, and the control signal DT for the third phase T settles at a negative value leading to an increase in the DC voltage in phase 10 of the converter.

Figure 17:
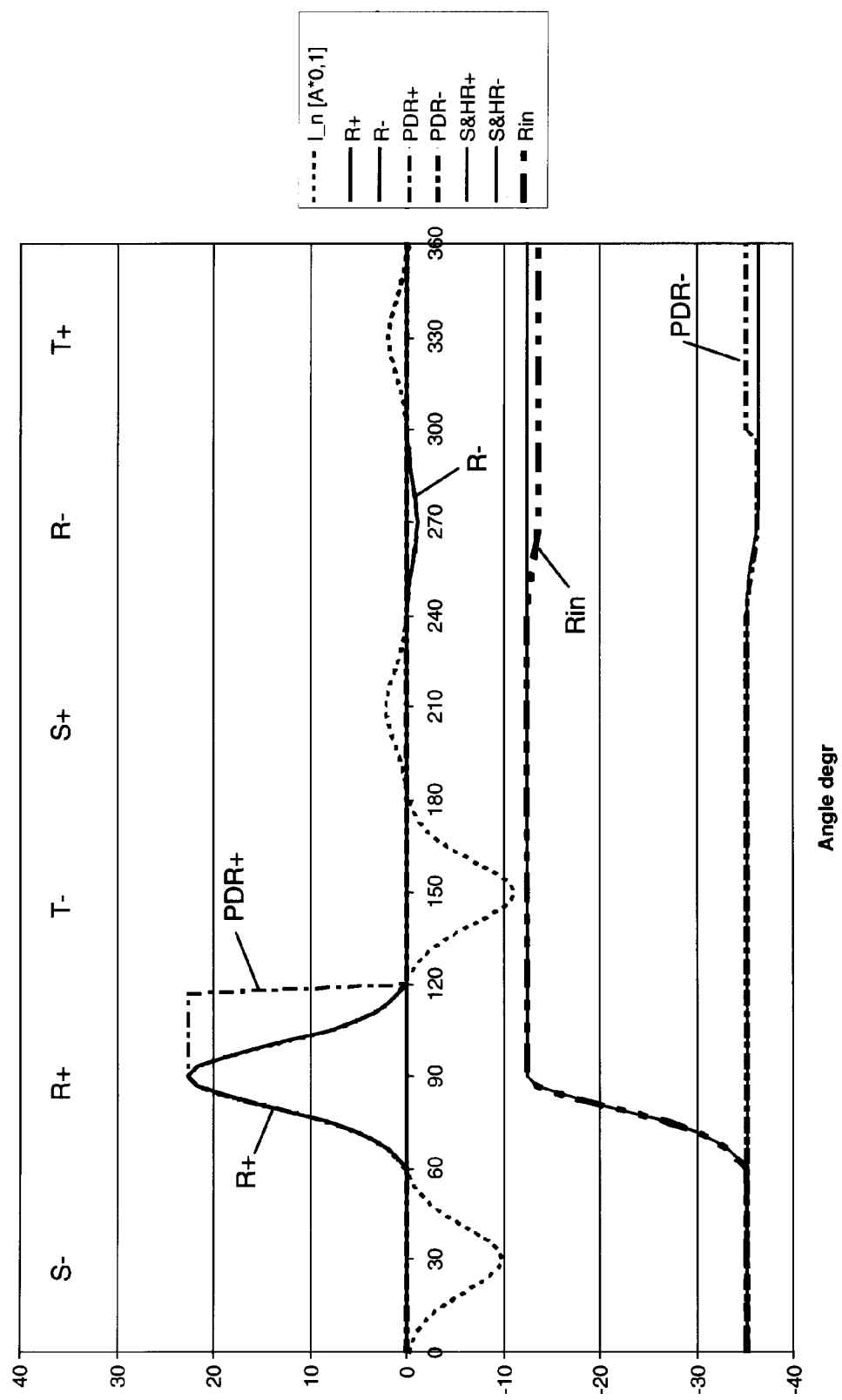
FIG. 17 shows the input and intermediate signals of the device for DC magnetization between phases R, T and S.
Figure 18:
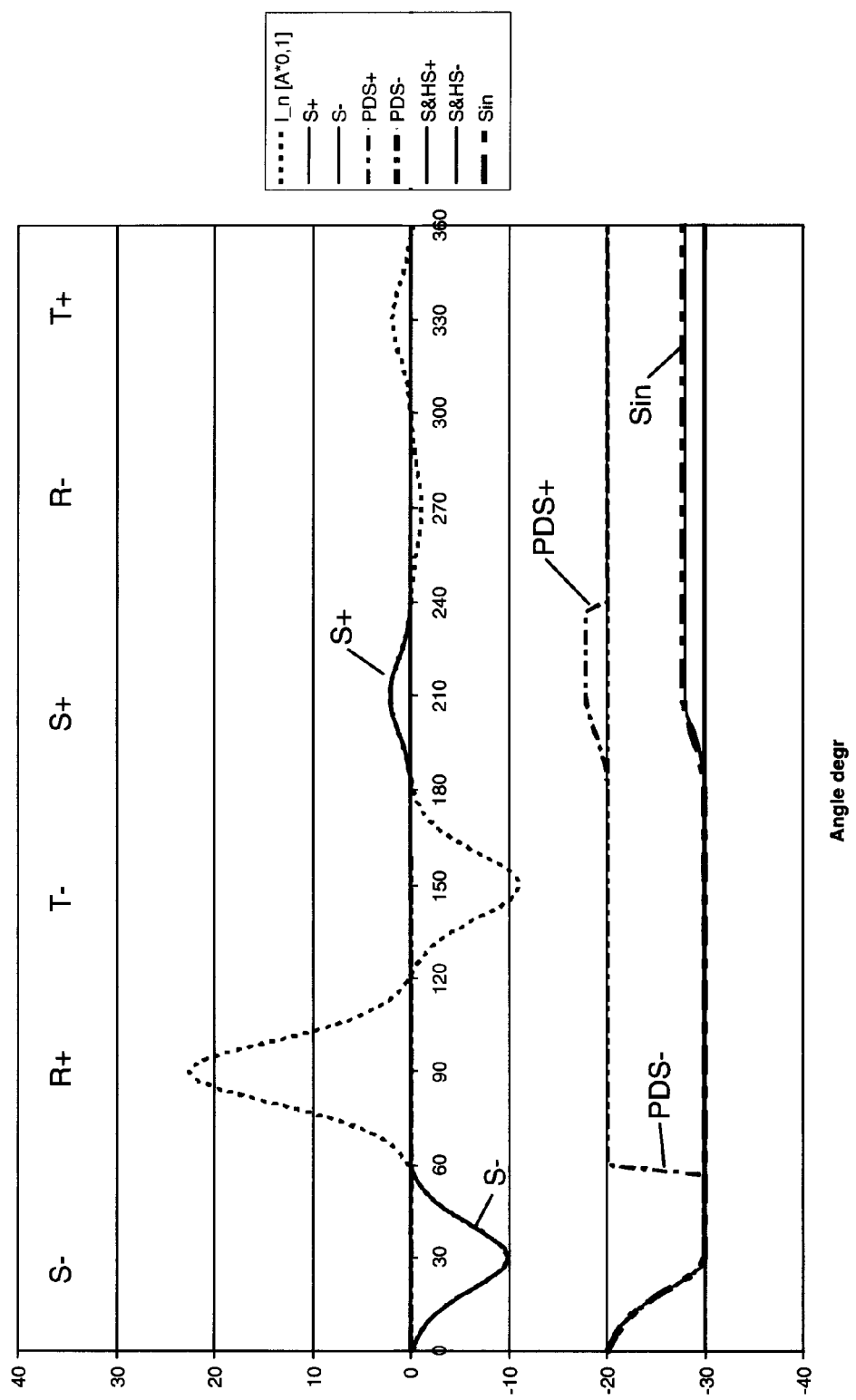
FIG. 18 shows the input and further intermediate signals of the device for DC magnetization between phases R, T and S.
Figure 19:
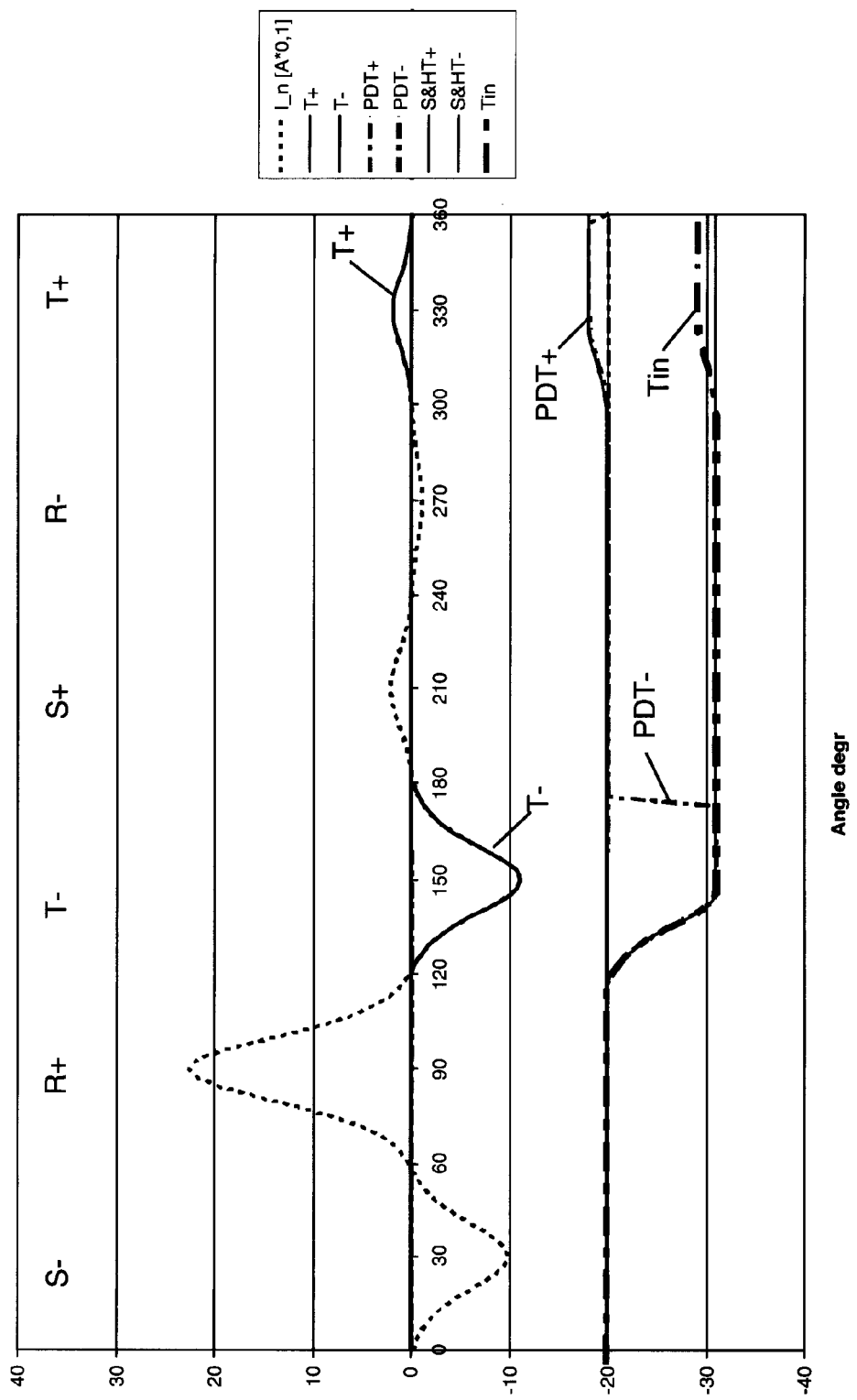
FIG. 19 shows the input and even further intermediate signals of the device for DC magnetization between phases R, T and S.
Figure 20:
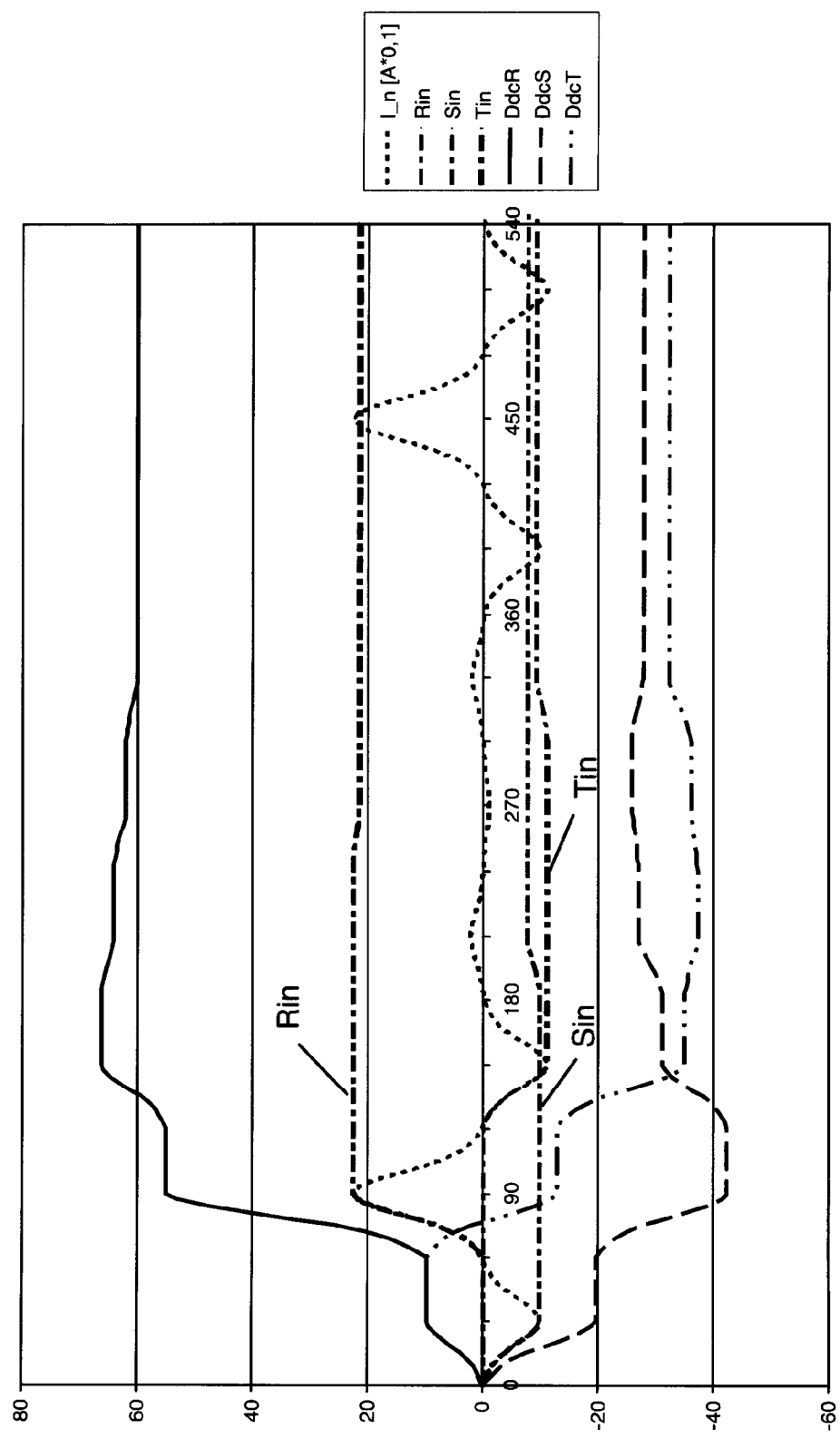
FIG. 20 shows the input and the control signals of the device for DC magnetization between phases R, T and S.

FIGS. 16 to 20 belong to the case where a DC magnetization occurs between all three phases R, S and T. The first phase R shows a distinct positive current amplitude R+ and the second and third phases S and T both have a higher negative (S− and T−) than positive (S+ and T+) current amplitude. In FIGS. 17 and 18, the offsets are the same as in FIGS. 12 and 13. In FIG. 19, the offset for the quantities PDT+, PDT−, S&HT+, S&HT− and Tin is −20. The three control signals which are shown in FIG. 20 request a decrease in the DC voltage of converter phase 8 and an increase in the DC voltages of converter phases 9 and 10.

Figure 21:
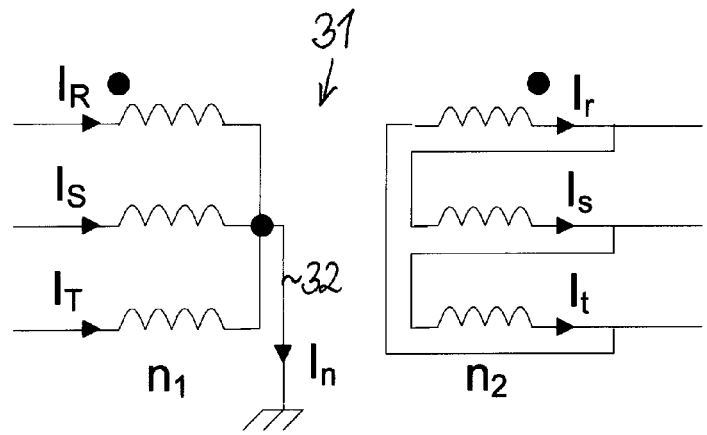
FIG. 21 shows a Y0/Δ connected transformer with internal Δ currents.

The transformer 31 of FIG. 21 differs from transformer 1 of FIG. 3 in that the secondary winding r, s and t is delta connected. It is assumed that the three phase currents $I_r$, $I_s$ and $I_t$ inside the delta connection are measured as well as the current $I_N$ flowing in the first neutral 32. The primary winding of the transformer 31 has a number of $n_1$ turns and the secondary winding has a number of $n_2$ turns. For the transformer 31, the current quantity $I_m$, which is input to device 17 can be determined according to the following equation:

$$I_m = I_n - \frac{n_2}{n_1} \cdot (I_r + I_s + I_t). \quad (1)$$

The current $I_n$ flowing in the first neutral 32 is to be reduced by the sum of the three internal delta phase currents $I_r$, $I_s$ and $I_t$, where the phase currents are to be multiplied by the turn ratio $n_2/n_1$. This is to be done for compensating the part of the primary zero-sequence current which corresponds to the current circulating in the secondary delta winding. The determination of the current quantity $I_m$, according to equation (1) could either be performed externally or it could be integrated into device 17. The compensation of DC magnetization works then in the same way as described above. In case the transformer 31 is provided with a tap changer, the value of the turn ratio $n_2/n_1$ needs to be adjusted according to the current tap changer position, i.e. the actual turn ratio is to be used.

If the neutral 32 of the primary winding of transformer 31 is not grounded, the current quantity can be determined for each of the phases separately, according to:

$$I_A = I_R - \frac{n_2}{n_1} \cdot I_r. \quad (2)$$

$$I_B = I_S - \frac{n_2}{n_1} \cdot I_s. \quad (3)$$

$$I_C = I_T - \frac{n_2}{n_1} \cdot I_t. \quad (4)$$

The three current quantities $I_A$, $I_B$ and $I_C$ are then—in original or filtered form—input to the demultiplexer 23. The demultiplexer 23 decomposes the first current quantity $I_A$ into the current components R+ and R−, according to the two phase angle ranges which correspond to the maxima and minima of the first phase R. In the same way are the current components S+ and S− for the second phase S derived from the second current quantity $I_B$, and the current components T+ and T− for the third phase T from the third current quantity $I_C$ (see also description of FIG. 24).

Figure 22:
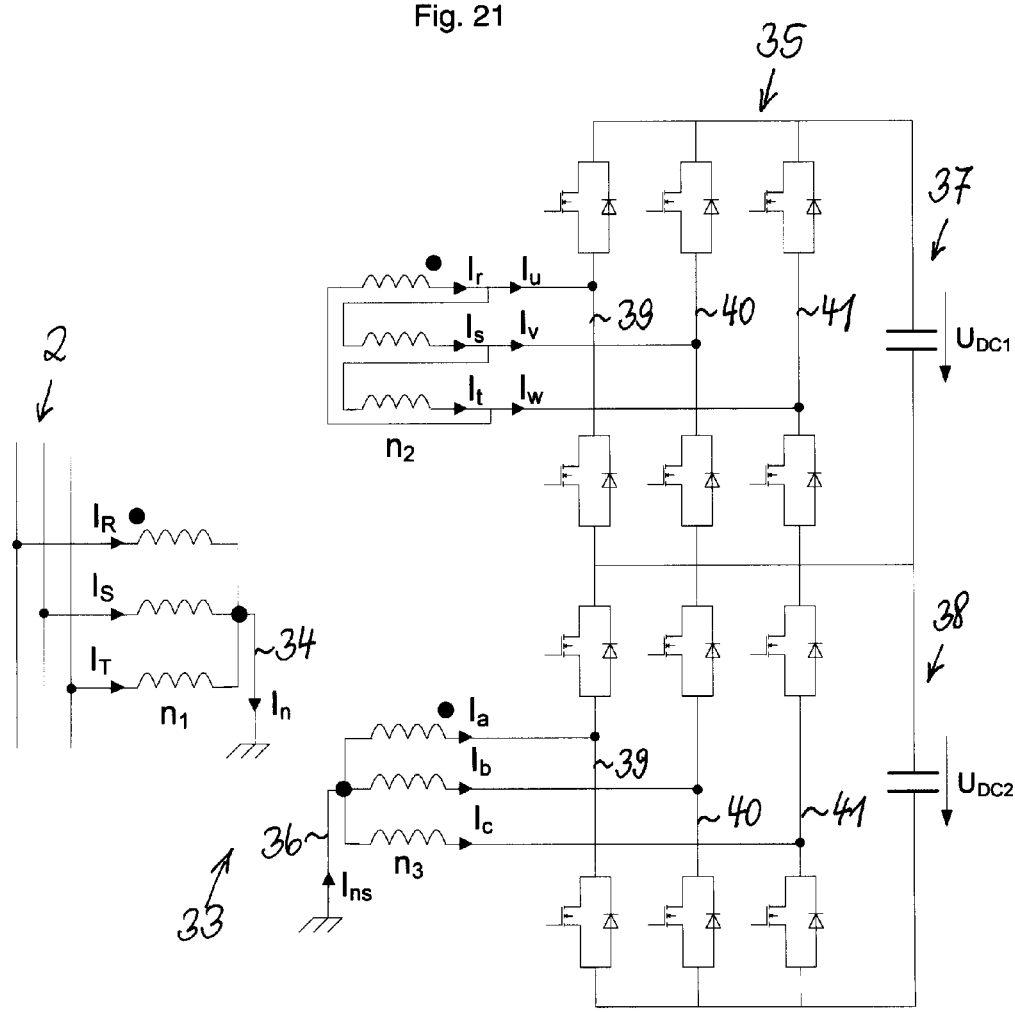
FIG. 22 shows a Y0/ΔY connected transformer with external Δ currents, connected between an AC-power system and an AC/DC or DC/AC converter.

FIG. 22 shows a three-phase three-winding transformer 33, where the primary side, which is connected to the AC power system 2, is again star connected and the star point is grounded via a first neutral 34. The number of turns of the first winding is $n_1$. On the secondary side, which is connected to a converter 35, the transformer 33 has two windings. The second winding is delta connected and has a number of turns $n_2$. The third winding has a number of $n_3$ turns and it is star connected, with the star point being grounded via a second neutral 36. The converter 35 is an AC/DC converter arranged as a 12-pulse bridge. The 12-pulse bridge consists of two 6-pulse bridges 37 and 38 which are connected in series. The 6-pulse bridges 37 and 38 comprise the same components as the 6-pulse bridge of FIG. 3 and are connected in the same way to one of the second and third winding of transformer 33, respectively.

Device 17 can be used also for the configuration of FIG. 22 to compensate for DC magnetization in the transformer 33. Assuming that again the internal currents $I_r$, $I_s$ and $I_t$ are measured in the second winding and that the currents $I_n$ and $I_{ns}$ flowing in the first and the second neutral 34 and 36, respectively, are determined, too. In that case, the current quantity $I_m$, can be determined by equation (2):

$$I_m = I_n - \frac{n_2}{n_1} \cdot (I_r + I_s + I_t) - \frac{n_3}{n_1} \cdot I_{ns}. \quad (2)$$

Accordingly, the current $I_n$ flowing in the first neutral 34 is not only to be reduced by the sum of the corrected internal delta phase currents $I_r$, $I_s$ and $I_t$ but also by the corrected current $I_{ns}$ flowing in the second neutral 36, where the current $I_{ns}$ in the second neutral is corrected by multiplying it with the turn ration $n_3/n_1$.

Figure 23:
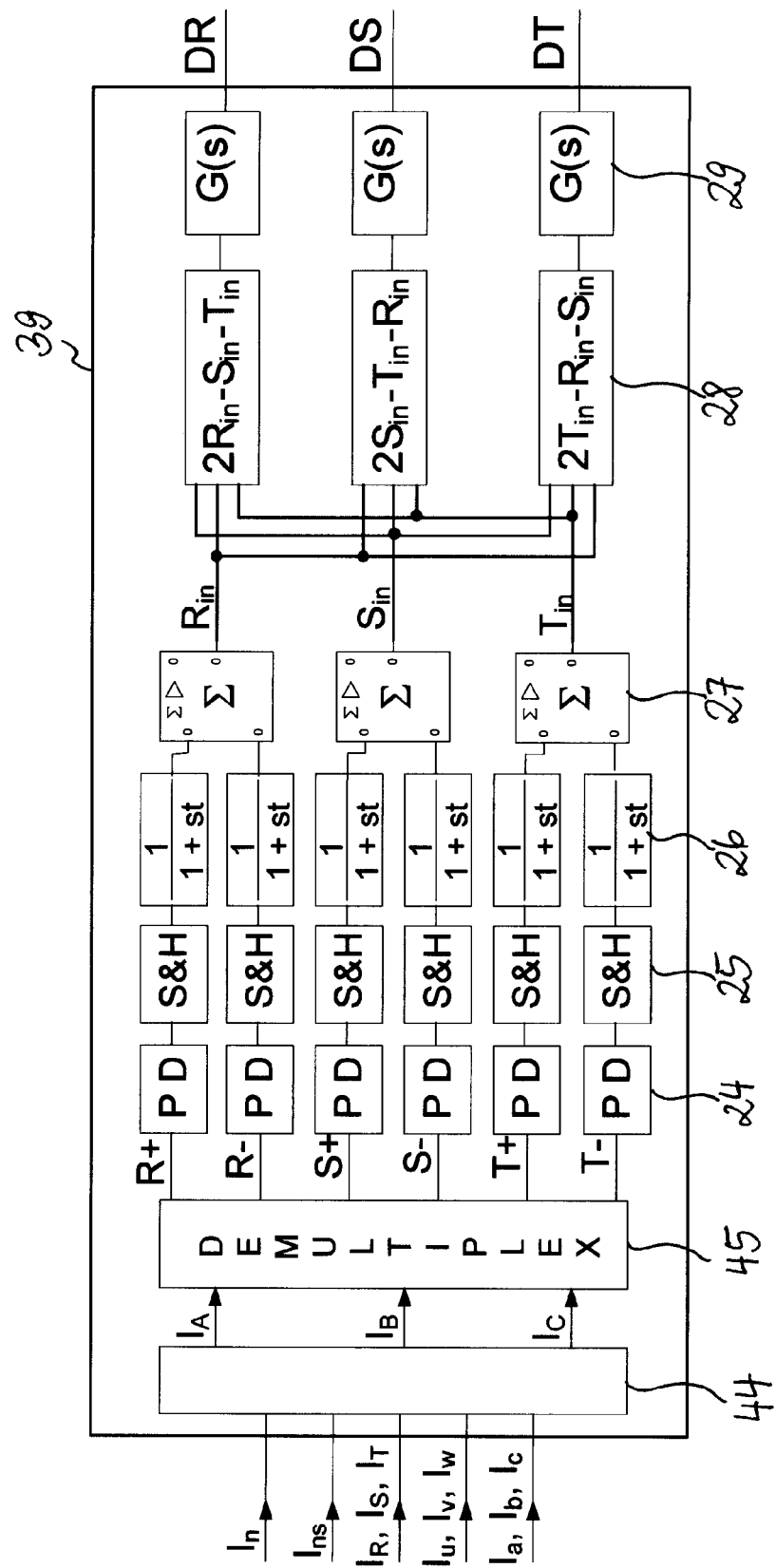
FIG. 23 shows the elements of another device to compensate for asymmetrical DC bias currents.

In case that, apart from the currents in the first and the second neutral, only the external phase currents $I_u$, $I_v$ and $I_w$ (FIG. 22) are measurable in the delta connected second winding, additionally the phase currents $I_R$, $I_S$ and $I_T$ in the first winding and the phase currents $I_a$, $I_b$ and $I_c$ in the third winding need to be known in order to determine the magnetic quantities Rin, Sin and Tin. FIG. 23 shows a device 39 to compensate for asymmetrical DC bias current in the transformers 31 or 33, where only external phase currents $I_u$, $I_v$, $I_w$ outside the delta winding are measurable. The device 39 comprises generally the same elements as device 17 of FIG. 5. Only the current quantity $I_m$, from which the positive and negative current components R+ to T− are determined are now replaced by three current quantities $I_A$, $I_B$ and $I_C$, one for each phase. Device 39 receives as input signals measurements from the currents $I_n$ and $I_{ns}$ flowing in the first and the second transformer neutrals 34 and 36 as well as measurements from the phase currents of each winding of the transformer. In case of the two-winding transformer 31, the inputs for the current $I_{ns}$ in the second neutral and for the phase currents $I_a$, $I_b$ and $I_c$ of the third winding are simply omitted and their values in the equations (3) to (5) below are replaced by zero. In general it can be noted that if one or more of the transformer circuits of FIG. 22 are open, the corresponding quantities in equations (3) to (5) are simply set to zero. For example, it is possible that the star point in the primary winding is left unconnected and thereby free floating. Then the corresponding current $I_n$ is set to zero. In the current processing unit 44 of device 39, the input currents are used to generate the three current quantities $I_A$, $I_B$ and $I_C$ based on the following equations:

$$I_A = \frac{1}{4} \cdot \left[ 3(I_R - I_S - I_T) + I_n - \frac{n_3}{n_1} \cdot (3(I_a - I_b - I_c) + I_{ns}) - \frac{2n_2}{n_1} \cdot (I_u - I_w) \right], \quad (3)$$

$$I_B = \frac{1}{4} \cdot \left[ 3(I_S - I_T - I_R) + I_n - \frac{n_3}{n_1} \cdot (3(I_b - I_c - I_a) + I_{ns}) - \frac{2n_2}{n_1} \cdot (I_v - I_u) \right], \quad (4)$$

$$I_C = \frac{1}{4} \cdot \left[ 3(I_T - I_R - I_S) + I_n - \frac{n_3}{n_1} \cdot (3(I_c - I_a - I_b) + I_{ns}) - \frac{2n_2}{n_1} \cdot (I_w - I_v) \right]. \quad (5)$$

Figure 24:
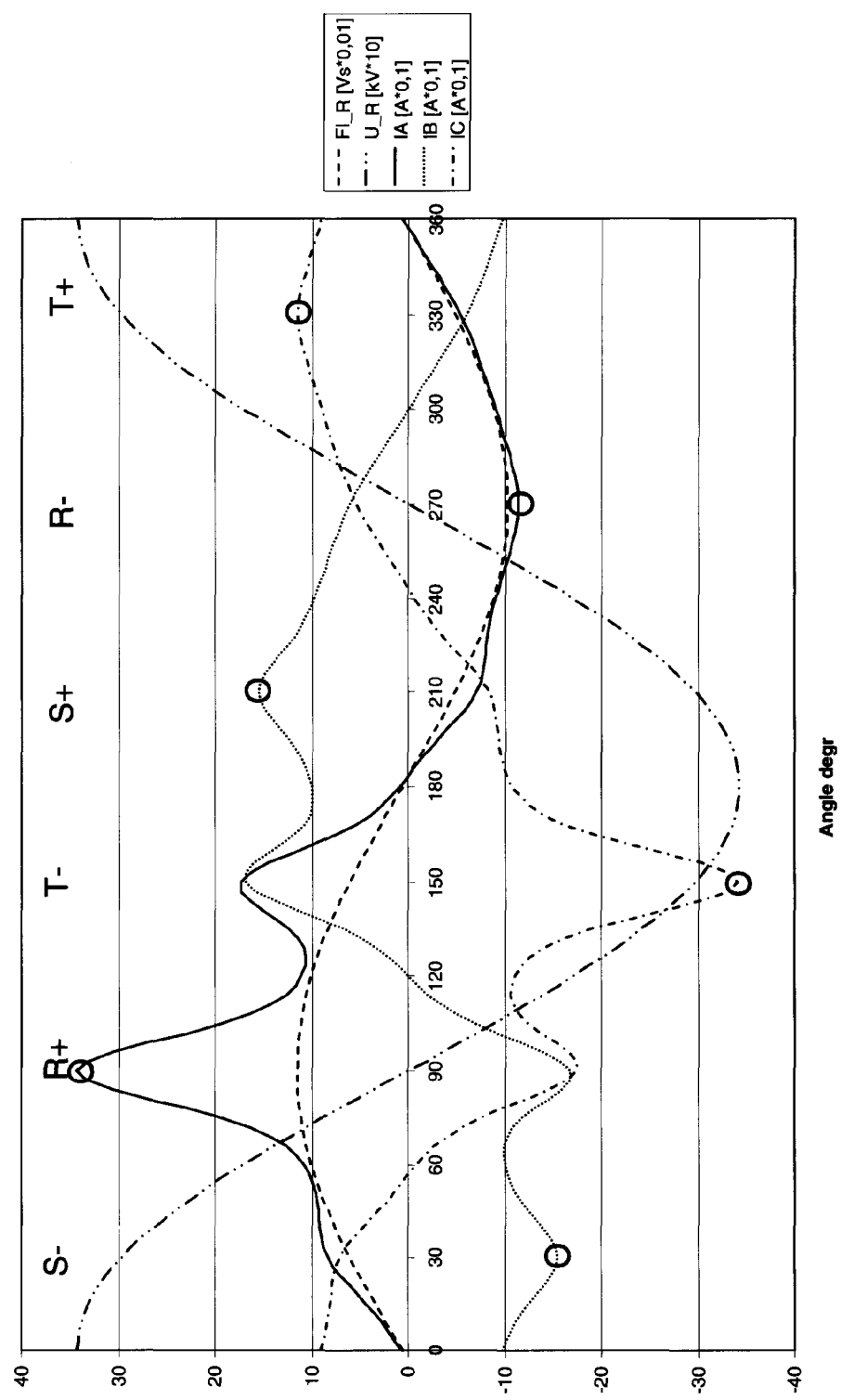
FIG. 24 shows electric and magnetic quantities of the transformer of FIG. 20 and the input signals to the device of FIG. 3.

FIG. 24 shows the magnetic flux and the phase voltage of the first phase R in the first winding of transformer 33 together with the three current quantities $I_A$, $I_B$ and $I_C$ in case of a DC magnetization between phases R and T. For each phase R, S and T, it is again possible to detect one positive and one negative current maximum during the corresponding electrical phase angle ranges. The maxima and minima are emphasized by small circles. As becomes clear from FIG. 24, the demultiplexer 45 of FIG. 23 creates from each of the current quantities $I_A$, $I_B$ and $I_C$ two current components according to the following phase angle ranges:

| From $I_A$: | R+: | 60° to 120°, |
|---|---|---|
| | R−: | 240° to 360°, |
| From $I_B$: | S+: | 180° to 240°, |
| | S−: | 0° to 60°, |
| From $I_C$: | T+: | 300° to 360°, |
| | T−: | 120° to 180°. |

The current components are then used in the same way as described above to generate the magnetic quantities Rin, Sin and Tin, which are then superimposed in order to eliminate all symmetrical DC magnetization components. From the results of the superimposition three control signals DR, DS and DT are created which influence via a PWM control unit the generation of DC voltage $U_{DC1}$−$U_{DC2}$ in the respective phase 39, 40 or 41 of converter 35 (DR—phase 39; DS—phase 40; DT—phase 41).

In case of a two-winding transformer according to FIG. 21 with measurement of external phase currents $I_u$, $I_v$ and $I_w$ on the secondary side, equations (3) to (5) are simplified to:

$$I_A = \frac{1}{4} \cdot \left[ 3(I_R - I_S - I_T) + I_n - \frac{2n_2}{n_1} \cdot (I_u - I_w) \right], \quad (6)$$

$$I_B = \frac{1}{4} \cdot \left[ 3(I_S - I_T - I_R) + I_n - \frac{2n_2}{n_1} \cdot (I_v - I_u) \right], \quad (7)$$

$$I_C = \frac{1}{4} \cdot \left[ 3(I_T - I_R - I_S) + I_n - \frac{2n_2}{n_1} \cdot (I_w - I_v) \right], \quad (8)$$

and instead of converter 35 only the upper 6-pulse bridge 37 would be connected to the transformer. Apart from that everything functions analogously to the above described three-winding transformer. For the equations (3) to (5) as well as for (6) to (8) is should be noted that in case where one of the currents flowing in the first or second neutral, respectively, is not measurable, it is instead possible to calculate the current $I_n$ or $I_{ns}$ by adding the corresponding phase currents $I_R$, $I_S$, $I_T$ or $I_a$, $I_b$, $I_c$, respectively.

The configurations and devices of FIGS. 3, 5, 21, 22 and 23 and their combinations can be used in modern HVDC power transmission systems. Since problems of noise generation and telephone disturbances caused by DC magnetization in the converter transformers are especially observed in HVDC systems with voltage source converters, the method and the device according to the invention can be advantageously used in particular in such an HVDC system.

The invention claimed is:

1. A method to compensate for an asymmetrical DC bias current in a three-phase transformer, wherein the transformer is connected between an AC power system and an AC/DC or DC/AC high voltage converter, wherein the transformer is star connected on a side to the AC power system, wherein for each phase of the AC side of the transformer a current quantity is determined, wherein the current quantity reflects a time dependent behaviour of a magnetizing current in the phase, the method comprising:
   determining a first electrical phase angle range in the current quantity during which the current quantity reaches a positive maximum and a second electrical phase angle range is determined during which the current quantity reaches a negative maximum;
   demultiplexing the current quantity according to the first and second electrical phase angle ranges to create two current components;
   determining the amplitude of the positive maximum and the amplitude of the negative maximum for the two current components;
   determining a DC magnetizing quantity from a difference between the amplitude of the positive maximum and the amplitude of the negative maximum;
   determining an asymmetrical quantity by superimposing the DC magnetizing quantity of the phase with the DC magnetizing quantities of the other phases; and generating a control signal from the asymmetrical quantity and providing the generated control signal to a control device of the converter in order to adjust the generation of the AC or DC voltage in the particular phase of the converter which corresponds to the phase of the AC side of the transformer.

2. The method according to claim 1, wherein the DC magnetizing quantity for each phase is determined by superimposing the positive and the negative maximum of that phase.

3. The method according to claim 1, wherein the transformer has a number of m phases and where the superimposition is performed by multiplying the DC magnetizing quantity with m reduced by one and by afterwards subtracting the DC magnetizing quantities of the other phases.

4. The method according to claim 1, wherein in case that the converter is an AC/DC converter, the generation of the DC voltage in the particular phase of the converter is adjusted so that the DC voltage is decreased when the corresponding asymmetrical quantity is positive and increased when the corresponding asymmetrical quantity is negative.

5. The method according to claim 1, wherein the control signals are reduced to zero in case of a fault in the AC power system, in the transformer or in the converter.

6. The method according to claim 1, wherein the transformer is a three-phase two-winding transformer which on the side to the AC power system is star connected and the star point is grounded via a first neutral and which on the side to the converter is star connected and the star point is grounded via a second neutral, and wherein the current quantity is set equal to the current flowing in the first neutral.

7. The method according to claim 1, wherein the transformer is a three-phase two-winding transformer which on the side to the AC power system is star connected and the star point is grounded via a first neutral and which on the side to the converter is delta connected and wherein
the current flowing in the first neutral is determined,
three phase currents are measured inside the delta connection, and
the current quantity is set equal to the current flowing in the first neutral reduced by the three phase currents.

8. The method according to claim 1, wherein the transformer is a three-phase two-winding transformer which on the side to the AC power system is star connected and the star point is electrically floating and which on the side to the converter is delta connected and where for each phase
the phase current in the star connection and the phase current inside the delta connection is measured, and
the current quantity is set equal to the current flowing in the star connection reduced by the current in the delta connection.

9. The method according to claim 7, wherein in case that the number of turns of the two windings differs, the three phase currents of the delta connection are multiplied by the turn ratio.

10. The method according to claim 7, wherein the transformer has an additional third winding on the side to the converter which is star connected and the star point is grounded via a second neutral, where the current flowing in the second neutral is determined and where the current quantity is set equal to the current flowing in the first neutral reduced by the three phase currents inside the delta connection and by the current flowing in the second neutral.

11. The method according to claim 10, wherein in case that the number of turns in the two windings with star connection differs, the current of the second neutral is multiplied by the turn ratio.

12. The method according to claim 1, wherein the transformer is a three-phase two-winding transformer which on the side to the AC power system is star connected and the star point is grounded via a first neutral and which on the side to the converter is delta connected and wherein
the current flowing in the first neutral is determined,
three phase currents are measured outside the delta connection,
three phase currents are measured on the AC side of the transformer, and
the current quantity is determined from the current flowing in the first neutral and from the six phase currents.

13. The method according to claim 12, wherein in case that the number of turns of the two windings differs, the three phase currents of the converter side are multiplied by the turn ratio.

14. The method according to claim 12, wherein the transformer has an additional third winding on the side to the converter which is star connected and the star point is grounded via a second neutral, where three phase currents in the third winding are measured and wherein the current quantity is determined from the currents flowing in the first and the second neutral and from the nine phase currents.

15. The method according to claim 14, wherein in case that the number of turns in the two windings with star connection differs, the current of the second neutral and the three phase currents in the third winding are multiplied by the turn ratio.

16. A device to compensate for asymmetrical DC bias current in a three-phase transformer, wherein the transformer is connected between an AC power system and an AC/DC or DC/AC high voltage converter, wherein the transformer is star connected on the side to the AC power system, the device comprising for each phase of the AC side of the transformer
means to determine a current quantity, wherein the current quantity reflects the time dependent behaviour of the magnetizing current in that phase;
means to determine a first electrical phase angle range in the current quantity during which the current quantity reaches a positive maximum, and to determine a second electrical phase angle range during which the current quantity reaches a negative maximum;
a demultiplexer to create two current components by demultiplexing the current quantity according to the first and second electrical phase angle ranges;
two peak detectors to determine for the two current components the amplitude of the positive maximum and the amplitude of the negative maximum, respectively;
means to determine a DC magnetizing quantity from a difference between the amplitude of the positive maximum and the amplitude of the negative maximum;
means to determine an asymmetrical quantity by superimposing the DC magnetizing quantity of the phase with the DC magnetizing quantities of the other phases; and
means to generate a control signal from the asymmetrical quantity and to provide the control signal to a control device of the converter in order to adjust the generation of the AC or DC voltage in the particular phase of the converter which corresponds to the phase of the AC side of the transformer.

17. The device according to claim 16, wherein the device is adapted to carry out a method comprising
determining a first electrical phase angle range in the current quantity during which the current quantity reaches a positive maximum and a second electrical phase angle range is determined during which the current quantity reaches a negative maximum;
demultiplexing the current quantity according to the first and second electrical phase angle ranges to create two current components;
determining the amplitude of the positive maximum and the amplitude of the negative maximum for the two current components;

determining a DC magnetizing quantity from a difference between the amplitude of the positive maximum and the amplitude of the negative maximum;

determining an asymmetrical quantity by superimposing the DC magnetizing quantity of the phase with the DC magnetizing quantities of the other phases; and generating a control signal from the asymmetrical quantity and providing the generated control signal to a control device of the converter in order to adjust the generation of the AC or DC voltage in the particular phase of the converter which corresponds to the phase of the AC side of the transformer, wherein the DC magnetizing quantity for each phase is determined by superimposing the positive and the negative maximum of that phase.

* * * * *